United States Patent [19]

(12) United States Patent
Kwon et al.

(10) Patent No.: US 7,830,972 B2
(45) Date of Patent: Nov. 9, 2010

(54) METHOD FOR ALLOCATING SIGNALS IN MULTI-CARRIER SYSTEM

(75) Inventors: Yeong Hyeon Kwon, Suwon-si (KR); Min Seok Noh, Seoul (KR); Seung Hee Han, Seoul (KR)

(73) Assignee: LG Electronics Inc., Seoul (KR)

( * ) Notice: Subject to any disclaimer, the term of this patent is extended or adjusted under 35 U.S.C. 154(b) by 854 days.

(21) Appl. No.: 11/688,207

(22) Filed: Mar. 19, 2007

(65) Prior Publication Data

US 2007/0217531 A1    Sep. 20, 2007

(30) Foreign Application Priority Data

Mar. 17, 2006   (KR) ...................... 10-2006-0024795
Mar. 20, 2006   (KR) ...................... 10-2006-0025136

(51) Int. Cl.
*H04K 1/10* (2006.01)
(52) U.S. Cl. ........................................... 375/260
(58) Field of Classification Search .................. 375/260
See application file for complete search history.

(56) References Cited

U.S. PATENT DOCUMENTS

| 7,593,347 | B2 * | 9/2009 | Maltsev et al. | .............. 370/252 |
| 2003/0224731 | A1 | 12/2003 | Yamaura et al. | |
| 2005/0015818 | A1 * | 1/2005 | Kim et al. | ................... 725/146 |
| 2005/0201268 | A1 * | 9/2005 | Aoki et al. | .................. 370/208 |

FOREIGN PATENT DOCUMENTS

| WO | 2005053198 | 6/2005 |
| WO | 2005060108 | 6/2005 |

* cited by examiner

*Primary Examiner*—David C Payne
*Assistant Examiner*—Tanmay K Shah
(74) *Attorney, Agent, or Firm*—Lee, Hong, Degerman, Kang & Waimey

(57) ABSTRACT

A method for transmitting control signals in a multi-carrier system. A method for arranging pilots in a transmitting side which transmits and receives data using a plurality of sub-carriers includes acquiring transmission data to be transmitted to a receiving side, processing data of a specific region among the transmission data in accordance with hidden pilots for channel estimation of the receiving side, allocating specific radio resources exclusively for the transmission data and dedicated pilots for channel estimation of the receiving side.

6 Claims, 29 Drawing Sheets

☐ Data  ▓ Pilots

Dedicated pilots    Hidden pilots   Data

▨ Dedicated pilots   ▩ Hidden pilots   ☐ Data

Dedicated pilots  Hidden pilots  Data

Codeword to be transmitted :

▨ Parity part1
▦ Parity part2
▧ Parity part3
☐ Pilot symbol

Initial transmission
First retransmission
Second retransmission (a)  (b)

(a)

(b)

(c)

(d)

(e)

(f)

Pilot signal antenna A
 antenna B

METHOD FOR ALLOCATING SIGNALS IN MULTI-CARRIER SYSTEM

This application claims the benefit of the Korean Patent Application Nos. P06-24795 filed on Mar. 17, 2006 and P06-25136 filed on Mar. 20, 2006, which are hereby incorporated by reference as if fully set forth herein.

BACKGROUND OF THE INVENTION

1. Field of the Invention

The present invention relates to a communication system using multi-carriers, and more particularly, to a method for allocating pilot signals in a communication system which transmits and receives data by using multi-carriers.

2. Discussion of the Related Art

The basic principle of orthogonal frequency division multiplexing (OFDM) which is one of modulation schemes used in a communication system is to divide a data stream having a high data transmission rate into a plurality of data streams having a low data transmission rate and simultaneously transmit the data streams by using a plurality of carriers. Each of the plurality of carriers is referred to as a sub-carrier. Since orthogonality exists among the plurality of carriers of the OFDM system, a receiving side can detect frequency components of the carriers even if the respective frequency components are overlapped with each other. The data stream having a high data transmission rate is converted into a plurality of data streams having a low data transmission rate through a serial to parallel converter. The converted data streams are multiplied by each of the sub-carriers, and the respective data streams are added to each other, whereby the resultant data streams are transmitted to the receiving side.

The plurality of parallel data streams generated by the serial to parallel converter can be modulated with a plurality of sub-carriers by inverse discrete fourier transform (IDFT). The IDFT can be realized efficiently using inverse fast fourier transform (IFFT).

Since symbol duration of a sub-carrier having a low data transmission rate increases, temporally relative signal dispersion generated by multi-path delay spread is reduced. Meanwhile, a guard interval longer than delay spread of a channel may be inserted between OFDM symbols to reduce inter-symbol interference. Also, if a part of an OFDM signal is copied in the guard interval and then arranged at a start part of the symbol, the OFDM symbol is cyclically extended to be guarded.

Hereinafter, a method for transmitting pilots in a 3 GPP long term evolution (LTE) system which is currently being discussed.

The 3 GPP LTE system which will become a standard of communication for next generation seeks a method for providing service to a user who is moving at high speed. In particular, the standard rules of the 3 GPP LTE system prescribe that communication can be performed even though the user moves at 500 km per hour. However, for the user who are moving at high speed, packet error increases in case of the existing burst type pilots. Although scattered type pilots can be adapted to time based variation, a problem occurs in that a mobile terminal should be maintained in an active mode not an idle mode.

Pilots are signal components used to estimate channel status in a wireless or wired communication, and are realized by transmitting a predetermined sequence which both a transmitting side and a receiving side know when electric waves are propagated through an unknown channel. The pilots may be referred to as training symbols. Accuracy of channel estimation at the receiving side is determined by a type or power of the transmitted pilots.

Pilot transmission in a conventional mobile communication system depends on a timing point of data transmission, i.e., early or later stage of communication. At the early stage of communication, a network of the mobile communication system transmits all pilots through a specific OFDM symbol to estimate radio channels at a time. Meanwhile, after the early stage of communication, pilot symbols are generally inserted to proper positions of the respective OFDM symbols to chase change of the channel. To estimate the channels using the pilots, each mobile terminal estimates the channels using the pilots included in the specific OFDM symbol and then updates the estimated channel values using scattered pilots.

FIG. 1 is a diagram for illustrating a related art method for transmitting time division multiplexing (TDM) type pilots. As shown in FIG. 1, pilot signals are included in a specific OFDM symbol. A method of arranging pilots shown in FIG. 1 can be used to estimate radio channels at a time at an early stage of communication as described above.

FIG. 2 is a diagram for illustrating a related art method for transmitting scattered pilots. As shown in FIG. 2, pilot signals are not concentrated on a specific OFDM symbol but scattered over the full frequency-time region. In other words, the pilot signals are included in at least two OFDM symbols. As described above, the method of FIG. 2 can be used when change of the channel values is updated after the full radio channels are estimated at the early stage of communication.

In a system which transmits the aforementioned TDM type pilots or the scattered pilots, a two-dimensional (2D) wiener filter is generally used to estimate channels. If the wiener filter is used, a filter value corresponding to a value of a channel to which data are only transmitted should be identified. Accordingly, interpolation and filtering are necessarily required. In other words, since every OFDM symbol does not include pilots, channel estimation is performed for a frequency-time region which does not include pilots, through interpolation and filtering, First, if portions to which pilots are transmitted are repeated per P number of OFDM symbols, the channels are estimated as follows in case of TDM type pilots. A receiving signal is determined as follows at a position where pilot symbols are received.

$$r_k(m) = H_k(m) s_k(m) + n_k(m) \qquad \text{[Equation 1]}$$

In Equation 1, $r_k(m)$ is a receiving signal at a position of a $k^{th}$ sub-carrier of an $m^{th}$ OFDM symbol, $H_k(m)$ is channel response at the $k^{th}$ sub-carrier of the $m^{th}$ OFDM symbol, $s_k(m)$ is a transmission symbol value at the $k^{th}$ position of the $m^{th}$ OFDM symbol, and $n_k(m)$ is a noise value at a corresponding position. These values can be expressed as vector types by Equation 2 below.

$$\vec{r}(m) = S(m)\vec{H}(m) + \vec{n}(m) \qquad \text{[Equation 2]}$$

If a position 'm' of the symbol is a position to which pilots are transmitted, the channels are estimated as expressed by Equation 3 below.

$$\hat{H}(m) = (S^H(m) S(m))^{-1} S^H(m) \vec{r}(m) \qquad \text{[Equation 3]}$$

If a communication channel can be modeled by L taps, i.e., L multi-paths, interpolation is applied to the above estimated values as expressed by Equation 4 below.

$$\hat{h}(m) = F^{-1} \hat{H}(m)$$

$$\vec{\hat{h}}(m) = [\hat{h}_0(m), \hat{h}_1(m), \ldots, \hat{h}_L(m), 0, 0, 0, \ldots, 0]^T \qquad \text{[Equation 4]}$$

Equation 4 indicates the estimated result of channel values for a specific OFDM symbol, and a channel model in a frequency region is finally obtained from the estimated result as expressed by Equation 5 below.

$$\overline{H}(m) = F\overline{h}(m) \qquad \text{[Equation 5]}$$

Since the channels estimated as expressed by Equation 5 above exist per $P^{th}$ position where pilots exist, such channel estimated values are used to decode data OFDM symbols between the pilots. In other words, since the channel values have been estimated for one of a total of P OFDM symbols, interpolation and filtering are performed to estimate channel values for the other (P-1) OFDM symbols. It is more appropriate that intermediate data OFDM symbols should be estimated through interpolation between the $P^{th}$ OFDM symbols than using the channel values of Equation 5 above. A method for predicting channels using interpolation is realized using $\overline{h}(m)$ of Equation 4 above. Since multi-path components of the channels are independent from one another, interpolation, prediction, and filtering can be applied to each multi-path component $\overline{h}_k(P_i)(i=0, 1, 2, \ldots)$ for k equally. At this time, related art Kalman and least square (LS) filters are used.

FIG. 3 is a diagram for illustrating a concept which predicts channels using pilot signals transmitted in a TDM mode according to the related art. Channel values for OFDM symbols which do not include pilots can be estimated using related art pilots included in a specific OFDM symbol. Generally, for more exact channel estimation, prediction and filtering as well as interpolation can be used together.

Hereinafter, the scattered pilots will be described.

If the scattered pilots are transmitted, the receiving side should delay channel estimation until a sufficient number of pilots are collected. If OFDM symbols which include L number of pilots which is the minimum number of pilots for channel estimation are all ensured, channel estimation can be performed in accordance with Equation 1 to Equation 5 above using a set of the ensured pilots.

Meanwhile, in case of the TDM type pilots, since channel estimation is determined based on an OFDM symbol time, channel estimation for channels where rapid change occurs cannot be performed.

On the other hand, in case of the scattered pilots, channels are not estimated per $P^{th}$ OFDM symbols but updated using accumulated pilots whenever one OFDM symbol is received after a sufficient number of pilots are collected. Because of this feature, rapid channel change can be estimated under the circumstances that channels are rapidly changed.

However, in case of the scattered pilots, a problem occurs in that high power consumption is caused. In other words, in case of the TDM type pilots, since channel estimation is completed in a moment, the mobile terminal can be shifted into an idle mode during the other time period. However, in case of the scattered pilots, the idle mode cannot be supported.

In the existing low speed system, the TDM type pilots or the scattered pilots could be discussed sufficiently in view of advantages. However, to support the mobile terminal which moves at high speed, a method for transmitting pilots at a time like the method for transmitting TDM type pilots fails to appropriately adapt to rapid channel change, and thus channel estimation is failed, whereby communication is cut off. Also, although the method for transmitting the scattered pilots appropriately adapts to channel change, a problem occurs in that the power is consumed as change of high speed continues to be chased.

A packet retransmission scheme, which is recently used in a mobile communication system, is a hybrid automatic repeat and request (HARQ) which controls throughput by increasing and decreasing parity bits through channel coding. Also, synchronous/asynchronous modes are considered as the HARQ scheme.

In the HARQ scheme, the receiving side decodes a packet transmitted from the transmitting side and identifies whether the packet has errors. Then, the receiving side transmits an acknowledgement signal (ACK) or a negative acknowledgement signal (NACK) to the transmitting side depending on the identified result. If the transmitting side receives ACK from the receiving side, it transmits a new packet and its encoded parity part. If the transmitting side receives NACK from the receiving side, it transmits a retransmission packet to which a parity part is added, wherein the parity part is not transmitted through the prior packet. Then, the receiving side combines the retransmission packet with the previously received packet to perform decoding again.

If an error occurs during channel decoding, the transmitting side and the receiving side undergo a procedure for increasing a log likelihood ratio (LLR) of each symbol so that the packet is decoded in accordance with pre-determined rules. The related art HARQ scheme can be classified into an incremental redundancy (IR) scheme which gradually transmits parity bits which are not transmitted previously and a chase combining or maximum ratio combining scheme which repeatedly transmits previously transmitted data. In case of the IR scheme, a code rate of a corresponding encoded packet is decreased at the receiving side as the number of packet retransmission increases, and decoding can be performed if the number of packet retransmission exceeds a certain threshold value. By contrast, in case of the chase combining or MRC scheme, previously transmitted code bits are re-transmitted so that the receiving side adds the value of the retransmitted bits to the value of the previously received bits. Also, the receiving side performs decoding using a feature of increasing an LLR of each code bit.

FIG. 4 is a diagram for illustrating the related art HARQ scheme. Referring to FIG. 4, an encoded codeword is transmitted by the IR scheme, and the receiving side transmits NACK to the transmitting side if it fails to decode a first packet. At this time, if the transmitting side selects a part, which is not transmitted, from the first packet to generate a retransmission packet and transmits the retransmission packet to the receiving side, the receiving side combines the first packet with the newly received packet to perform packet decoding.

If the packet is decoded, the receiving side transmits ACK to the transmitting side, and transmission of a corresponding codeword is completed. However, if the receiving side still fails to decode the packet the transmitting side collects corresponding parity parts which are not transmitted and transmits them. If there are no parity parts which are not transmitted, the transmitting side re-transmits the previously transmitted parity part. At this time, the receiving side performs MRC based decoding, and adds the newly received parity value to the previously received parity value to generate a new value as expressed by Equation 6 below. The generated value increases an LLR value and improves codeword decoding likelihood.

$$r(k) = \frac{\sum_{i=0}^{n} h^{i*}(k) r^i(k)}{\sum_{i=0}^{n} h^{i*}(k) h^i(k)} \qquad \text{[Equation 6]}$$

In Equation 6, $r^i(k)$ is a value which a $k^{th}$ code symbol is received during the $i^{th}$ transmission, and $h^i(k)$ is a channel value of the $k^{th}$ code symbol during the $i^{th}$ transmission.

According to this retransmission procedure, packet decoding can be performed after arbitrary retransmission in accordance with Shannon theory.

Among factors which actually determine throughput of a link in a mobile communication system, the powerful factors are a synchronization level between the transmitting side and the receiving side, accuracy of channel estimation, and a signal to noise ratio (SNR) of the received signal. The aforementioned HARQ scheme could be an access for improving throughput of the link by solving a problem of the received SNR.

Meanwhile, in a mobile communication system based on orthogonal frequency division multiplexing (OFDM) or orthogonal frequency division multiplexing access (OFDMA), a data frame is defined by a two-dimensional plane where a vertical axis is used as a frequency axis and a horizontal axis is used as a time axis. The transmitting side allocates pilot signals to some of the two-dimensional data area during data transmission, allocates desired transmission data to the other data area, and transmits them to the receiving side. The receiving side estimates channels using the pilot signals transmitted from the transmitting side and decodes the transmitted data using the estimated channels.

Accordingly, decoding performance may depend on accuracy of channel estimation based on the pilot signals of the receiving side. Particularly, since the mobile communication system requires sufficient performance for a user who moves at maximum 350 km/h, accuracy of channel estimation is necessarily required under the channel environment which is varied every moment.

Supposing that accuracy of channel estimation is maintained at a certain level, the related art HARQ scheme is focused on a method for transmitting desired packets as soon as possible from a transmitting side to a receiving side, i.e., a method for improving throughput. However, if channel properties are rapidly varied in a mobile communication system due to the presence of a user who moves at high speed, a problem related to packet decoding at the receiving side occurs due to channel decoding performed in a state that channel estimation is not performed exactly. Also, if the SNR of the received signal is low, accuracy of channel estimation may be lowered. In this case, a method for improving accuracy of channel estimation should be considered. However, since the related art considers only an access for transmitting prior packets well, an error in channel estimation is not considered when a packet is actually decoded. For this reason, a problem occurs in that desired throughput is not obtained even in case of decrease of a coding rate through retransmission.

SUMMARY OF THE INVENTION

Accordingly, the present invention is directed to a method for allocating pilots in a communication system, which substantially obviates one or more problems due to limitations and disadvantages of the related art.

An object of the present invention is to provide a method for allocating pilots in a communication system, which can easily estimate rapid channel change.

Another object of the present invention is to provide a method for allocating pilots in a communication system, in which an idle mode is supported to reduce power consumption of a mobile terminal.

Still another object of the present invention is to provide a method for increasing accuracy of channel estimation for retransmission packets in a mobile communication system which supports an HARQ scheme.

Further still another object of the present invention is to provide a method for improving decoding performance of a receiving side in a mobile communication system which supports an HARQ scheme.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for allocating pilots to transmit data using a plurality of sub-carriers comprises allocating dedicated pilots, allocating hidden pilots by performing data processing of a part of data to be transmitted to a receiving side, and allocating a remaining part of the data to be transmitted to the receiving side.

In another aspect of the present invention, a method for estimating channels in a receiving side which transmits and receives data using a plurality of sub-carriers comprises receiving radio signals including dedicated pilots and hidden pilots for channel estimation of a receiving side, and performing channel estimation by using the dedicated pilots and the hidden pilots.

In another aspect of the present invention, a method for estimating channels in a receiving side which transmits and receives data using a plurality of sub-carriers comprises receiving radio signals transmitted from a transmitting side through radio resources allocated exclusively for transmission data for the receiving side and dedicated pilots for channel estimation of the receiving side, and performing channel estimation using pilots included in the radio signals, wherein data processing is performed depending hidden pilots for channel estimation of the receiving side in some area of the transmission data.

In another aspect of the present invention, a method for a retransmitting packet in a mobile communication system which supports a hybrid automatic repeat and request (HARQ) scheme comprises receiving a negative acknowledgement signal (NACK) from a receiving side in response to an initial transmission packet transmitted from a transmitting side, and transmitting to the receiving side a retransmission packet including reference signals having a first arrangement pattern which is different from a second arrangement pattern of reference signals included in the initial transmission packet.

In another aspect of the present invention, a method for a retransmitting packet in a mobile communication system which supports an HARQ scheme comprises transmitting to a receiving side a packet including reference signals having a first arrangement pattern in a first region, receiving a negative acknowledgement signal (NACK) from the receiving side in response to the packet, and transmitting to the receiving side a retransmission packet having a second arrangement pattern of reference signals, the second arrangement pattern of reference signal being different from the first arrangement pattern.

In another aspect of the present invention, a method for a retransmitting packet in a mobile communication system which supports an HARQ scheme comprises transmitting a retransmission packet to which additional reference signals are not added at least one time to a receiving side in response to a NACK to packet transmission from the receiving side, and transmitting a retransmission packet, to which additional reference signals are added to a region, at least one time to the receiving side in response to a NACK to packet transmission from the receiving side.

In another aspect of the present invention, a method for recovering a packet in a mobile communication system which supports an HARQ scheme comprises a) performing channel estimation by using basic reference signals included in a packet transmitted from a transmitting side, b) recovering the received packet based on channel-estimated values obtained by the channel estimation, c) transmitting a NACK to the transmitting side if the packet recovery is failed, d) receiving a retransmission packet including the basic reference signals and additional reference signals from the transmitting side, e) updating the channel-estimated values by performing channel estimation based on the basic reference signals and the additional reference signals, and f) recovering the retransmitted packet based on the updated channel estimated values.

In another aspect of the present invention, a method for recovering a packet in a mobile communication system which supports an HARQ scheme comprises receiving a first retransmission packet not including additional reference signals at least one time from a transmitting side in response to a NACK, receiving a second retransmission packet including additional reference signals added to a region of the second retransmission packet at least one time from the transmitting side in response to a NACK, and recovering a corresponding packet using the first and second retransmission packets.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
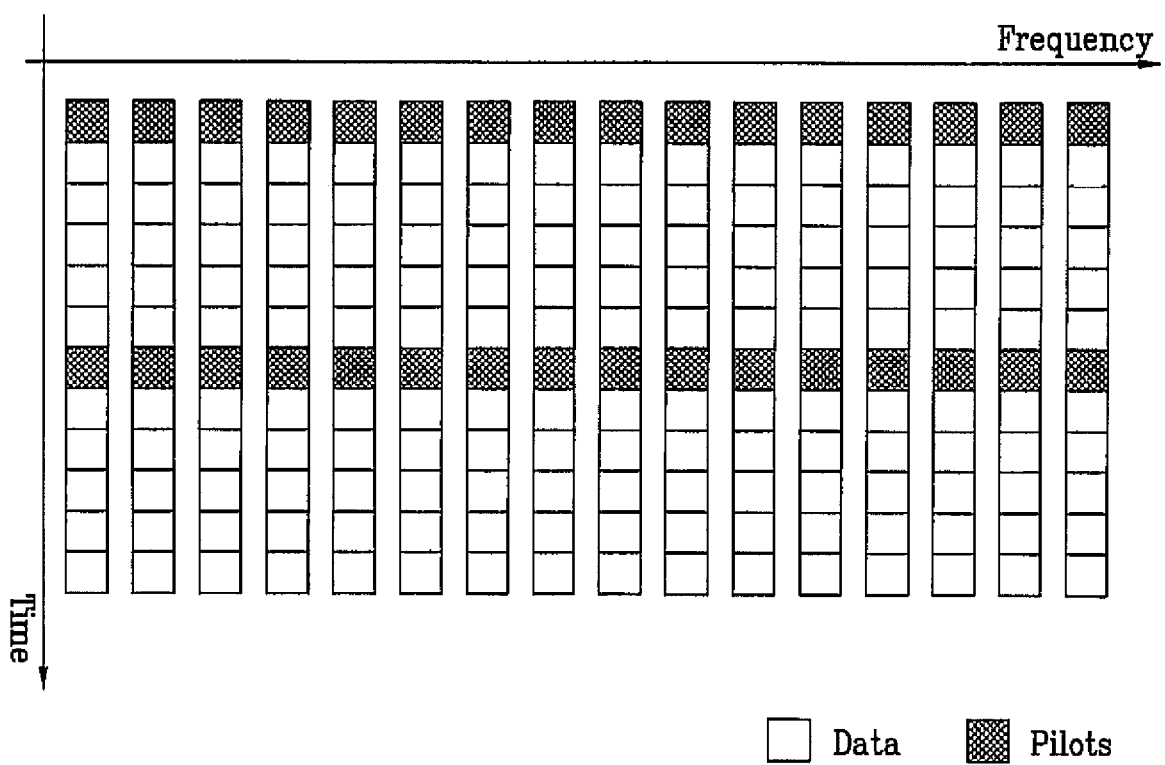
FIG. 1 is a diagram illustrating a related art method for transmitting TDM type pilots.
Figure 2:
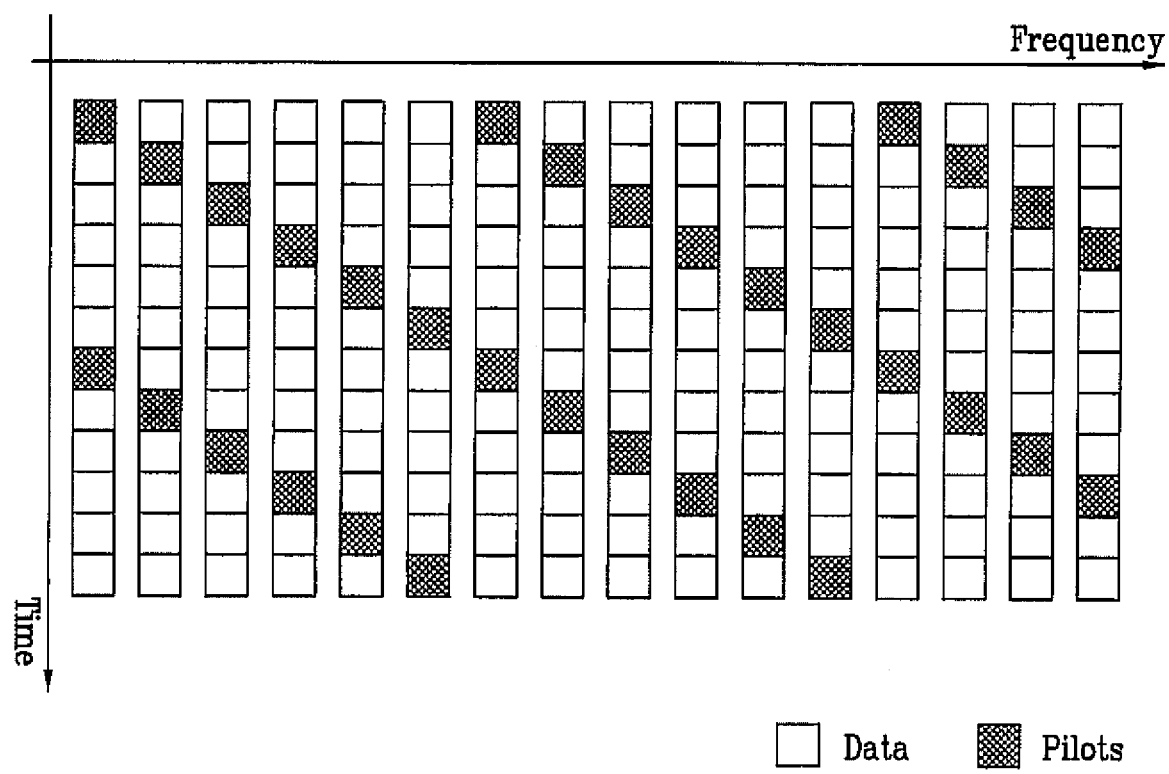
FIG. 2 is a diagram illustrating a related art method for transmitting scattered pilots.
Figure 3:
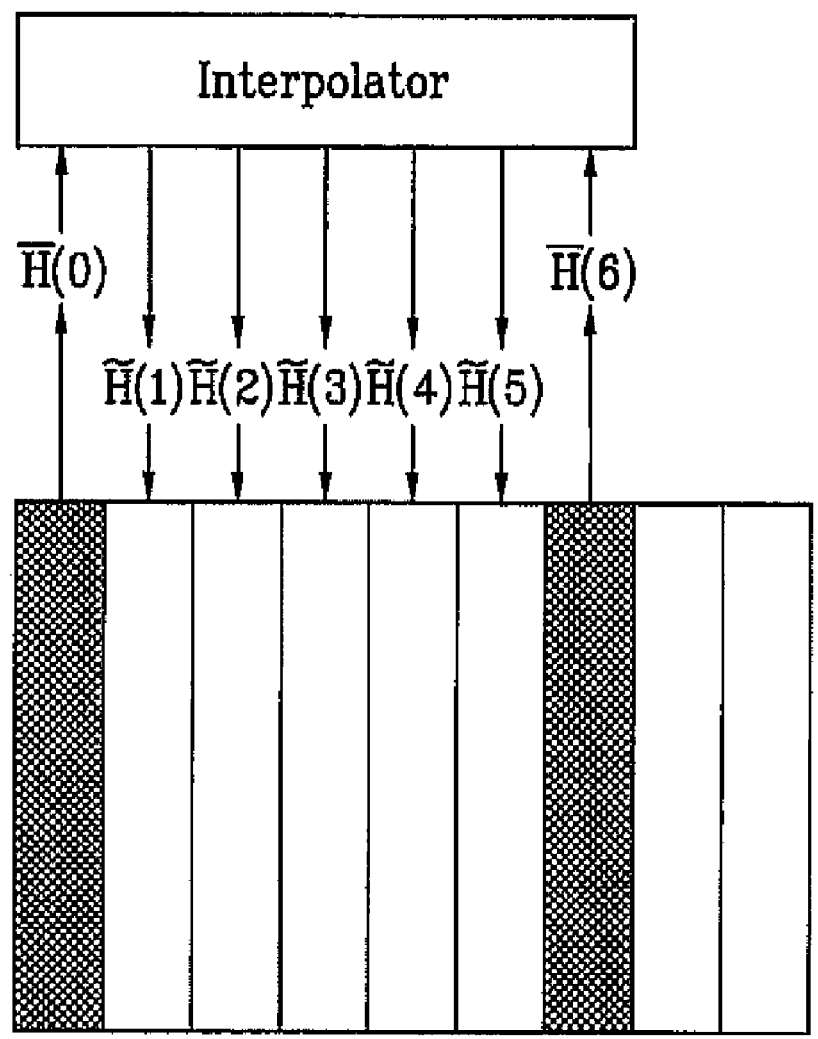
FIG. 3 is a diagram illustrating a concept which estimates channels using pilot signals transmitted in a TDM mode according to the related art.
Figure 4:
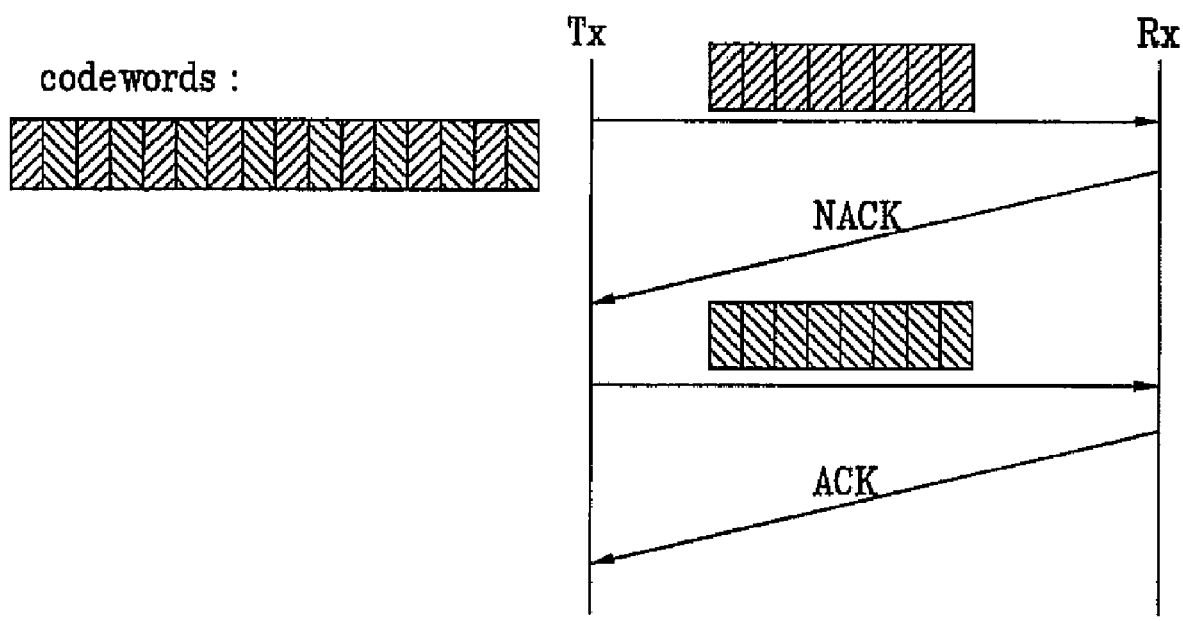
FIG. 4 is a diagram illustrating a related art HARQ scheme.

Reference will now be made in detail to the embodiments of the present invention, examples of which are illustrated in the accompanying drawings. Wherever possible, the same reference numbers will be used throughout the drawings to refer to the same or like parts.

In the embodiment of the present invention, a method for effectively performing channel estimation of a mobile terminal which moves at high speed and allowing the mobile terminal to be in an idle mode is suggested.

Embodiments in accordance with the present invention can be applied to a communication system which transmits data by using a plurality of orthogonal sub-carriers. Accordingly, the method for allocating pilots in accordance with the embodiment of the present invention can be applied to all of the related art OFDM, DFT-S-OFDM, and OFDMA systems, etc.

According to the embodiment of the present invention, a method for appropriately combining TDM type pilots with scattered pilots is suggested, wherein pilots included in data to be transmitted are also used. The data means information other than the pilots, and generally include various kinds of information to be transmitted to a receiving side. The pilots are reference signals or training signals which the receiving side and a transmitting side previously know, and could be signals having pre-defined amplitude and phase. The receiving side can perform equalization by estimating channels by using the pilot signals.

Since a mobile terminal which receives signals according to a pilot arrangement scheme in accordance with an embodiment of the present invention supports an idle mode, the embodiment of the present invention provides a method for arranging pilots, wherein channel estimation can be performed using one OFDM symbol only. Also, the embodiment of the present invention provides a method for arranging pilots, wherein channel estimation can be performed per OFDM symbol to adapt to rapid channel change. To achieve features of the two methods, the TDM pilots can be combined with the scattered pilots. However, in this case, a problem occurs in that throughput of the whole system is reduced due to pilot transmission. Accordingly, additional bandwidth overhead should be minimized for channel estimation per OFDM symbol. In the embodiment of the present invention, pilot signals are transmitted along with data to solve the above problem.

Hereinafter, the TDM type pilots and the scattered pilots will be referred to as dedicated pilots for convenience of description. The dedicated pilots are signals transmitted through a frequency-time region, and mean signals which do not include the data but include pilot signals only.

Hereinafter, the dedicated pilots will be referred to as TDM pilots if the dedicated pilots are transmitted by being included in one OFDM symbol. The dedicated pilots will be referred to as scattered pilots if the dedicated pilots are transmitted by being included in two or more OFDM symbols.

Furthermore, pilot signals transmitted through a frequency-time region through which data is transmitted will be referred to as hidden pilots. Hereinafter, the hidden pilots will be described in detail.

The transmitting side may transmit data for the unit of an OFDM sub-frame (hereinafter, referred to as 'sub-frame') which includes a specific number of OFDM symbols. The number of the OFDM symbols included in the sub-frame may be variable or fixed, and there is no limitation in the number of the OFDM symbols.

In this embodiment, the dedicated pilots are transmitted along with the hidden pilots. The hidden pilots are mixed with the data to be transmitted, and are advantageous in that throughput of a communication system is not reduced. However, since the hidden pilots are weaker than the dedicated pilots, a problem occurs in that throughput degradation seriously occurs if the channel status is not good. Accordingly, in this embodiment of the present invention, the dedicated pilots and the hidden pilots will appropriately be used together.

Hereinafter, the hidden pilots will be described. All or a part of frequency-time region resources through which data are transmitted are overlapped with frequency-time region resources through which the hidden pilots are transmitted. In other words, the data and the hidden pilots are processed by various data processing methods, which will be described below, and then transmitted to the receiving side through the same frequency-time region. Hereinafter, detailed examples of the data processing methods for mixing the data and the hidden pilots will be described.

$$\vec{x} = (\lambda)\vec{d} + (1-\lambda)\vec{p}$$ [Equation 7a]

Supposing that the hidden pilot signals are P and the data are d, a vector x indicating transmission signals can be generated in accordance with Equation 7a above. In Equation 7a, λ is a real number between 0 and 1, and is used to determine a weight value between the data and the hidden pilot signals.

$$\vec{x} = \vec{d} \cdot \vec{p}$$ [Equation 7b]

or $$\vec{x} = \vec{d}\exp(j\vec{p})$$

Equation 7b describes another method for generating hidden pilot signals, wherein transmission signals can be generated by multiplying the data and the hidden pilots (or specific value determined by the hidden pilots).

$$\vec{x} = \vec{d}(1 + \vec{p})$$ [Equation 7c]

Equation 7c describes another method for generating hidden pilot signals, wherein transmission signals can be generated by sum and product between the data and the hidden pilots.

Hereinafter, a method for using dedicated pilots and hidden pilots together will be described.

Figure 5A:
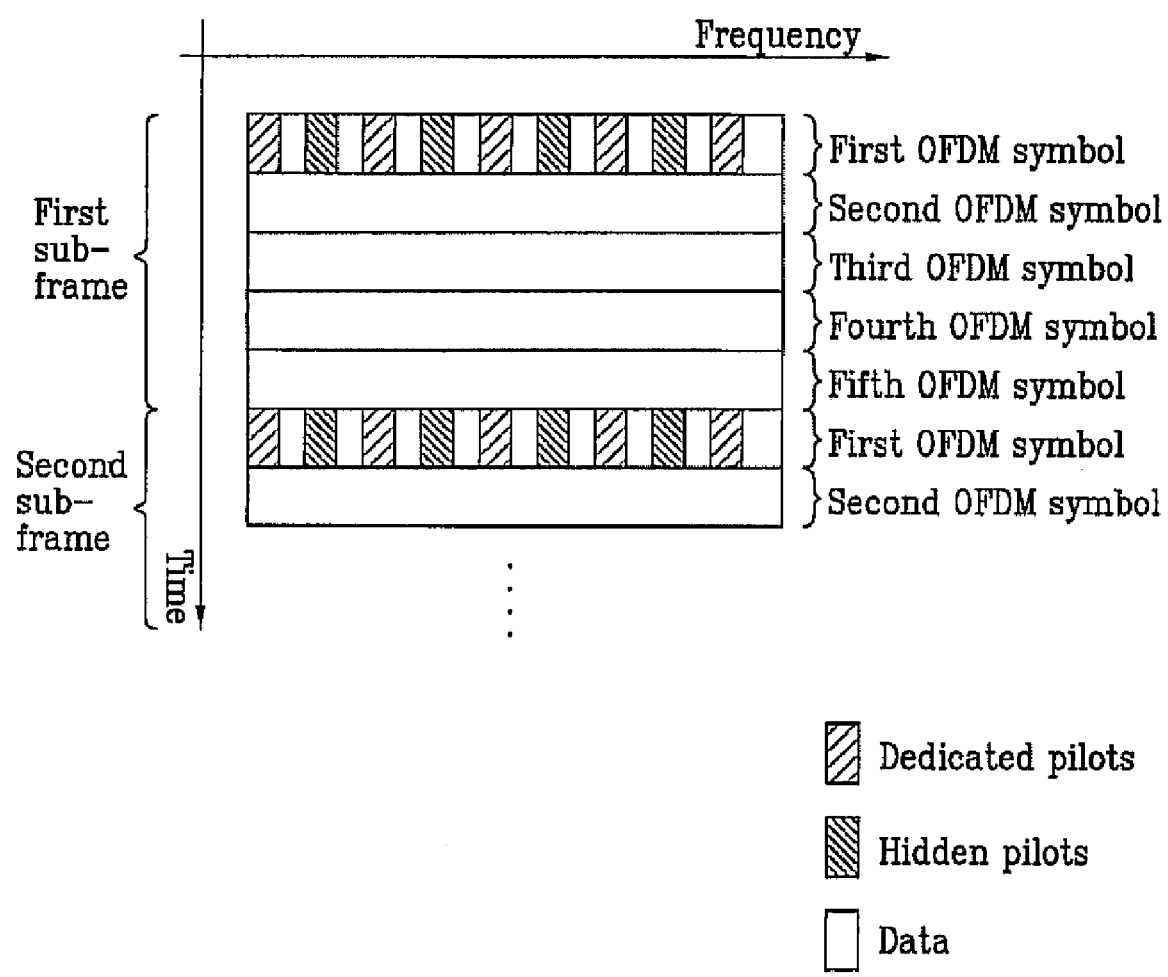
FIGS. 5A to 5D are diagrams illustrating examples of a method for transmitting dedicated pilots and hidden pilots together in accordance with the embodiment of the present invention.

FIG. 5A is a diagram illustrating an example of a method for transmitting dedicated pilots and hidden pilots together in accordance with the embodiment of the present invention. As shown in FIG. 5A, the transmission signals are transmitted from the transmitting side for the unit of sub-frame including at least one OFDM symbol. One OFDM symbol represents data processed through IFFT operation of one time. Accordingly, data included in the OFDM symbol is transmitted for the unit of the same time period. In other words, the OFDM symbol represents data transmitted through a specific frequency band for a specific time unit, i.e., one time slot. A first sub-frame shown in FIG. 5A includes five OFDM symbols, and the first OFDM symbol includes the dedicated pilots. Since the dedicated pilots are included in a specific OFDM symbol, they may be referred to as the TDM type pilots.

According to this embodiment of the present invention, the transmitting side can transmit the hidden pilots along with the first OFDM symbol, wherein the hidden pilots are included in the first OFDM symbol. The hidden pilot signals can be generated by various methods. The hidden pilot signals can be generated by the methods of Equation 7a to Equation 7c. As shown in FIG. 5A, the transmitting side transmits the signals for the unit of five OFDM symbols, and pilot patterns included in each sub-frame may be equal to or different from one another. If the patterns of the dedicated pilots and the hidden pilots included in each sub-frame are variable, additional information indicating variable patterns is required. Accordingly, it is preferable that the pilot patterns included in each sub-frame are constant.

Figure 5B:
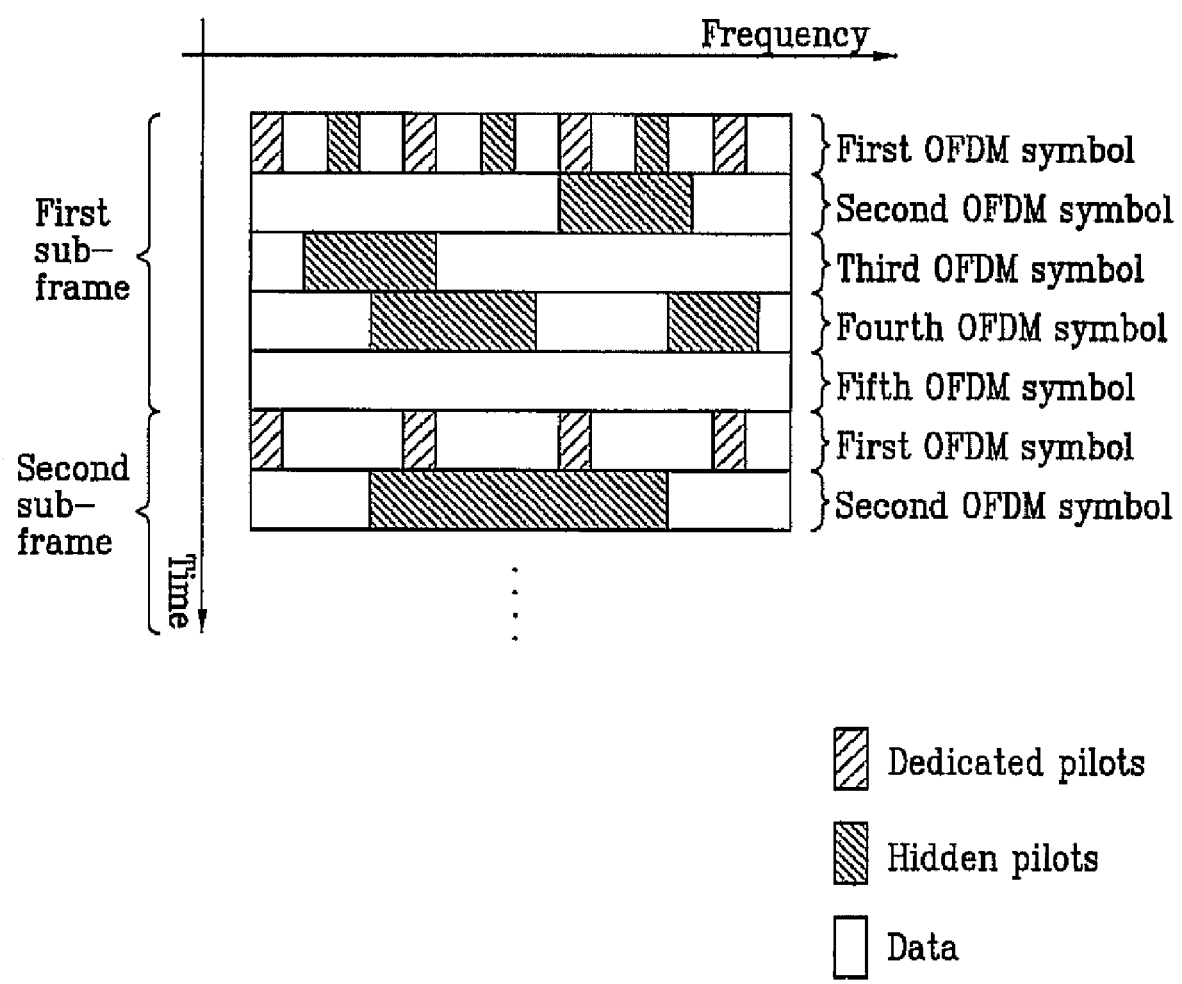

FIG. 5B is a diagram illustrating another example of a method for transmitting dedicated pilots and hidden pilots together in accordance with the embodiment of the present invention. Unlike the example of FIG. 5A, referring to FIG. 5B, the hidden pilots are scattered in the first to fifth OFDM symbols. The frequency-time region through which the hidden pilots are transmitted may adaptively be varied depending on the communication environment or may previously be set at the transmitting side and the receiving side.

Referring to the examples of FIGS. 5A and 5B, the dedicated pilots correspond to the TDM type pilots. The receiving side which receives the transmission signals including the TDM type pilots receives the first OFDM symbol to identify whether later transmission signals are for the receiving side. If the transmission signals are for the receiving side, the receiving side is maintained in an active state. If the transmission signals are not for the receiving side, the receiving side can convert the active state into a microsleep mode which corresponds to an idle state, so as to reduce power consumption. As described above, the receiving side can reduce power consumption by converting the active state into the idle state and continue to receive the hidden pilots in the active state to sense rapid channel change. Also, since the hidden pilots are additionally provided to assist channel estimation and equalization of the receiving side, it is possible to save the frequency-time resources used for transmission of the dedicated pilots. In other words, it is possible to transmit the data to the receiving side using a smaller frequency-time region.

Figure 5C:
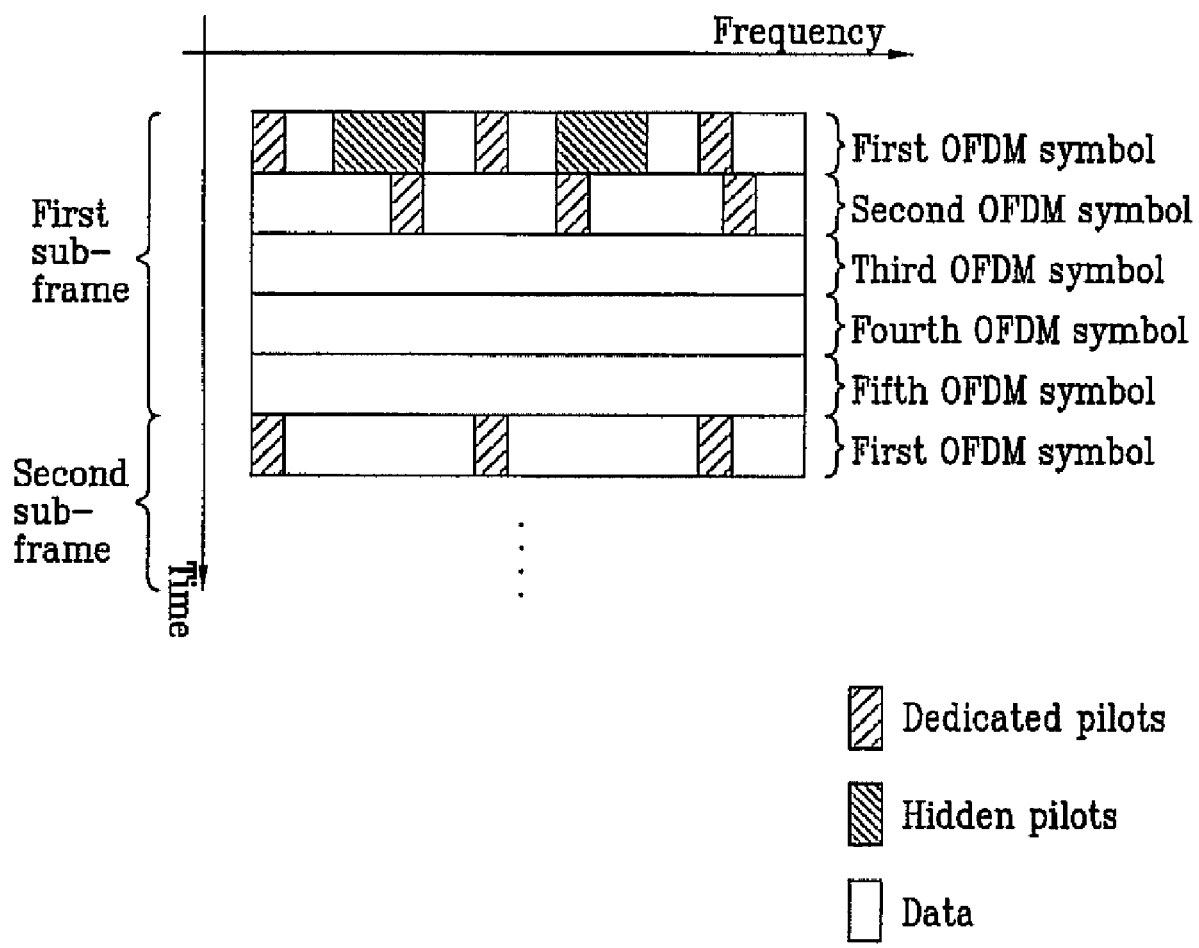

FIG. 5C is a diagram illustrating another example of a method for transmitting dedicated pilots and hidden pilots together in accordance with the embodiment of the present invention. As shown in FIG. 5C, the first OFDM symbol and the second OFDM symbol include the dedicated pilots. In other words, the dedicated pilots correspond to the scattered pilots. The dedicated pilots may be included in the other OFDM symbols other than the first and second OFDM symbols. As shown in FIG. 5C, the hidden pilots may be included in the first OFDM symbol to assist channel estimation of the receiving side. As described above, it is preferable that the pilot patterns are repeated for each sub-frame. However, the pilot patterns may be varied for each sub-frame. Although the hidden pilots are included in the first OFDM symbol of the first sub-frame as shown in FIG. 5, the hidden pilots may be included in the other OFDM symbols of the second sub-frame.

Figure 5D:
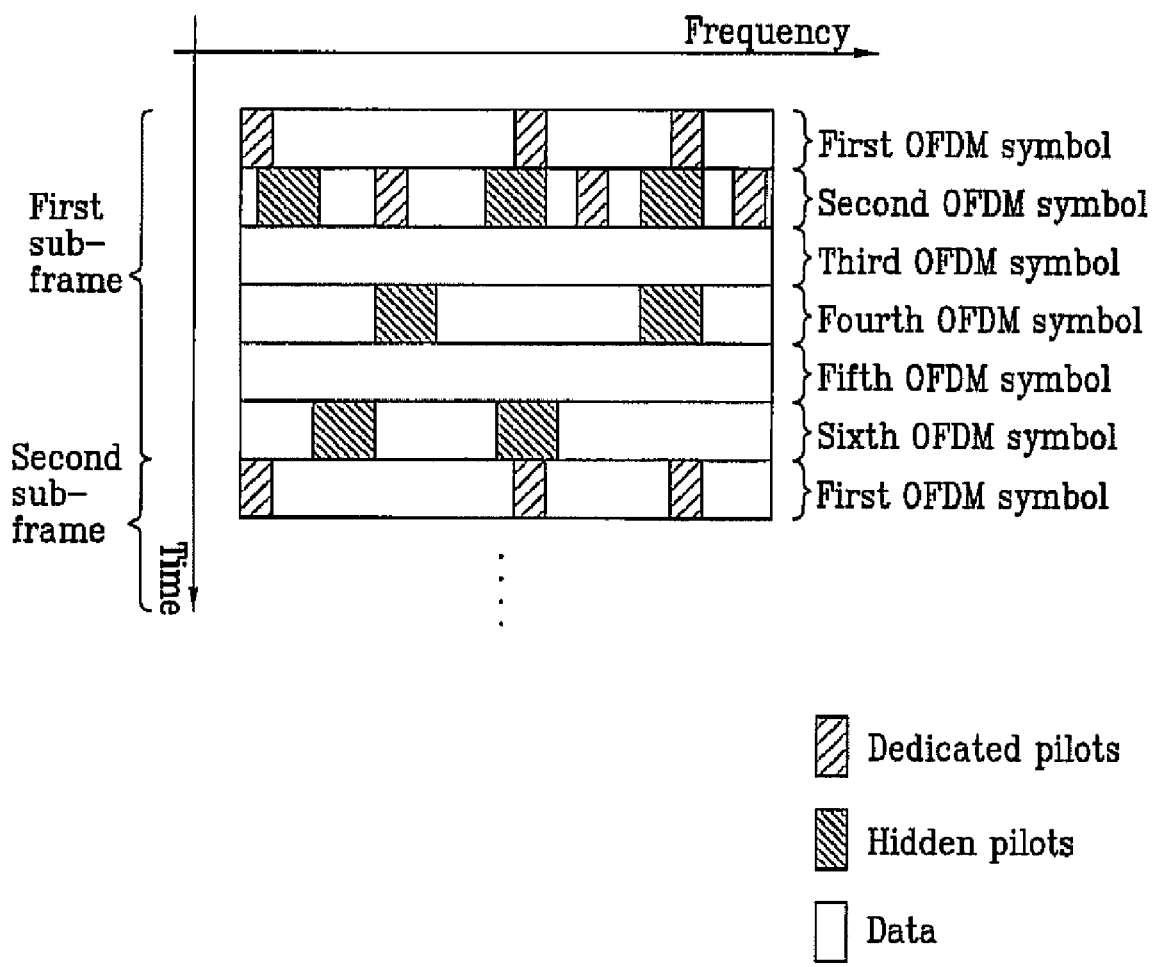

FIG. 5D is a diagram illustrating another example of a method for transmitting dedicated pilots and hidden pilots together in accordance with the embodiment of the present invention. As shown in FIG. 5D, the hidden pilots can be transmitted through the second OFDM symbol to the sixth OFDM symbol.

Figure 6A:
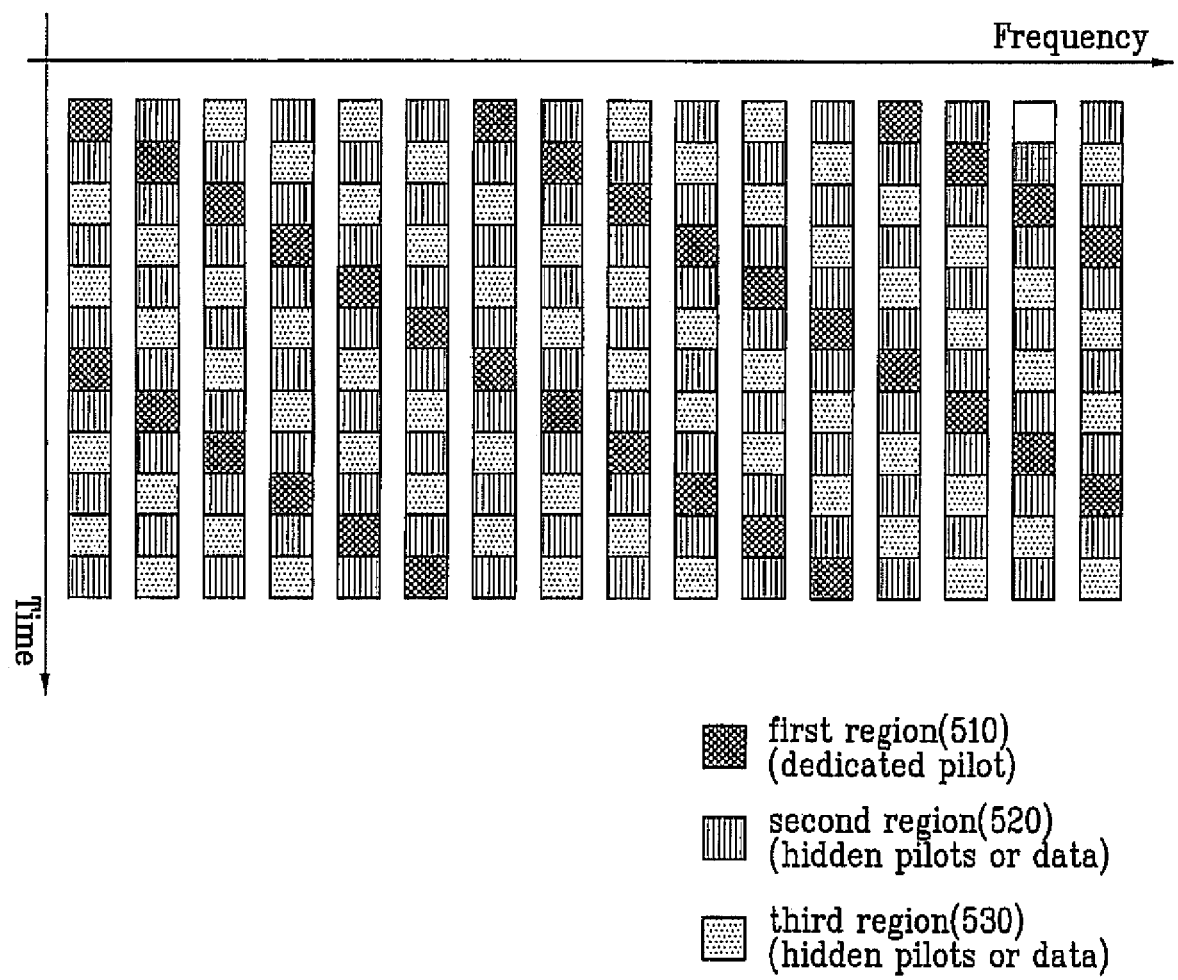
FIGS. 6A to 6C are diagrams illustrating examples of a method for transmitting scattered pilots and hidden pilots together in accordance with the embodiment of the present invention.

FIG. 6A is a diagram illustrating an example of a method for transmitting scatted pilots and hidden pilots together in accordance with the embodiment of the present invention. As shown in FIG. 6A, the hidden pilots may be included through the whole frequency-time region or a part of the frequency-time region.

It is more preferable that the method for arranging pilots as shown in FIG. 6A is adaptively used depending on the channel environment. In other words, it is preferable that a relatively small number of radio resources are used for the pilots if the channel status is good or the estimated channel value is excellent while a relatively large number of radio resources are used for the pilots if the channel status is not good or the estimated channel value is poor. In more detail, if the radio resources of FIG. 6A are divided into three regions 510, 520 and 530, it is preferable that the first region 510 transmits the dedicated pilots only when the channel status is good (or when the channel environment is good) while the second region 520 additionally transmits the hidden pilots when the channel environment is not good. Also, the hidden pilots may additionally be allocated to the third region 530 when the channel environment becomes worse as the mobile terminal moves at high speed or due to other reasons.

Figure 6B:
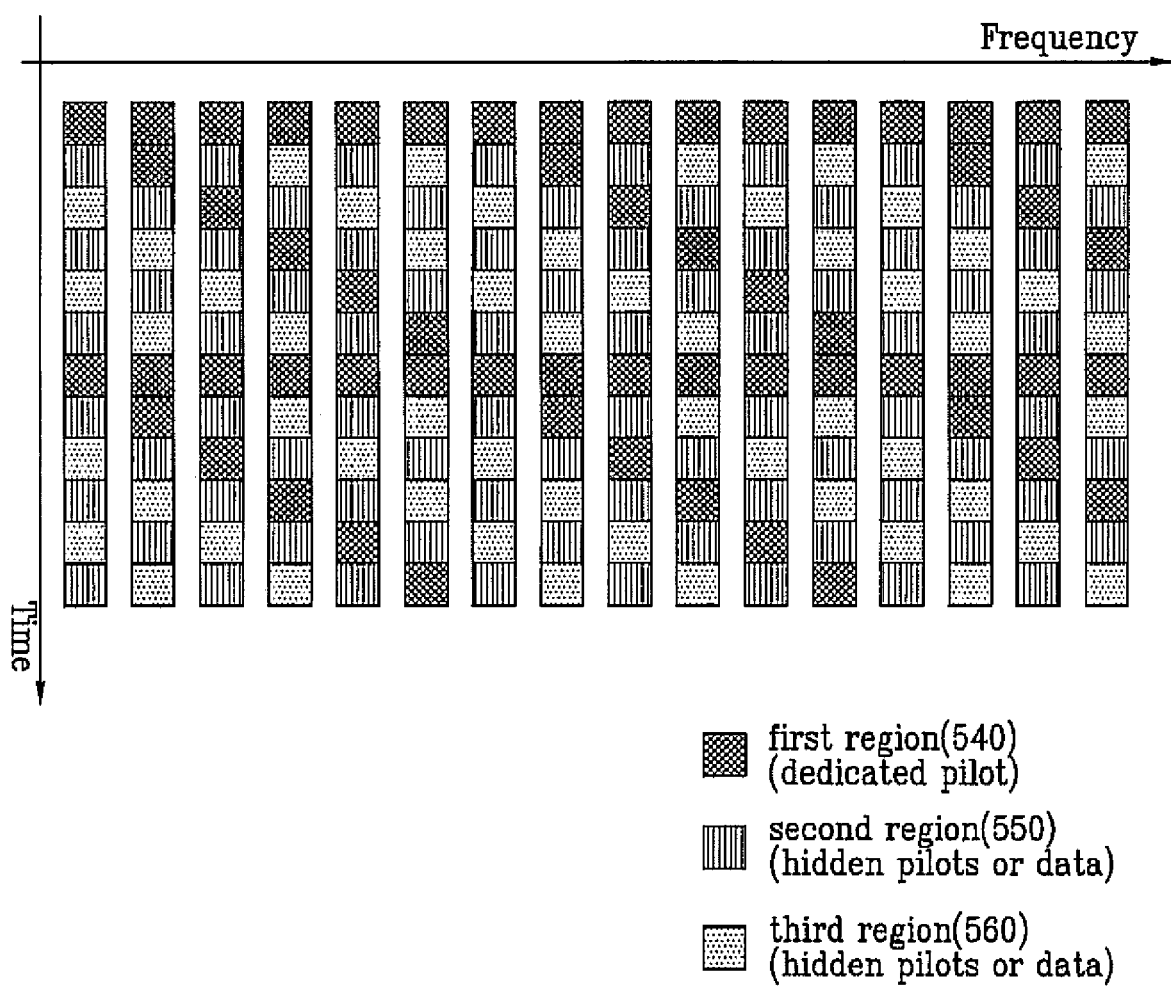

FIG. 6B is a diagram illustrating an example of a method for transmitting TDM type pilots, scatted pilots and hidden pilots together in accordance with the embodiment of the present invention. As described above, the dedicated pilots and the hidden pilots can be transmitted in accordance with this embodiment of the present invention. Since the dedicated pilots are at least one of the TDM type pilots and the scattered pilots, the TDM type pilots, the scattered pilots, and the hidden pilots can be transmitted together as shown in FIG. 6B.

It is preferable that the method for arranging pilots as shown in FIG. 6B is adaptively used depending on the channel environment. In more detail, if the radio resources of FIG. 6B are divided into three regions 540, 550 and 560, it is preferable that the first region 540 transmits the dedicated pilots only when the channel states is good (or when the channel environment is good) while the second region 550 additionally transmits the hidden pilots when the channel environment is not good. Also, the hidden pilots may additionally be allocated to the third region 560 when the channel environment becomes worse as the mobile terminal moves at high speed or due to other reasons.

Figure 6C:
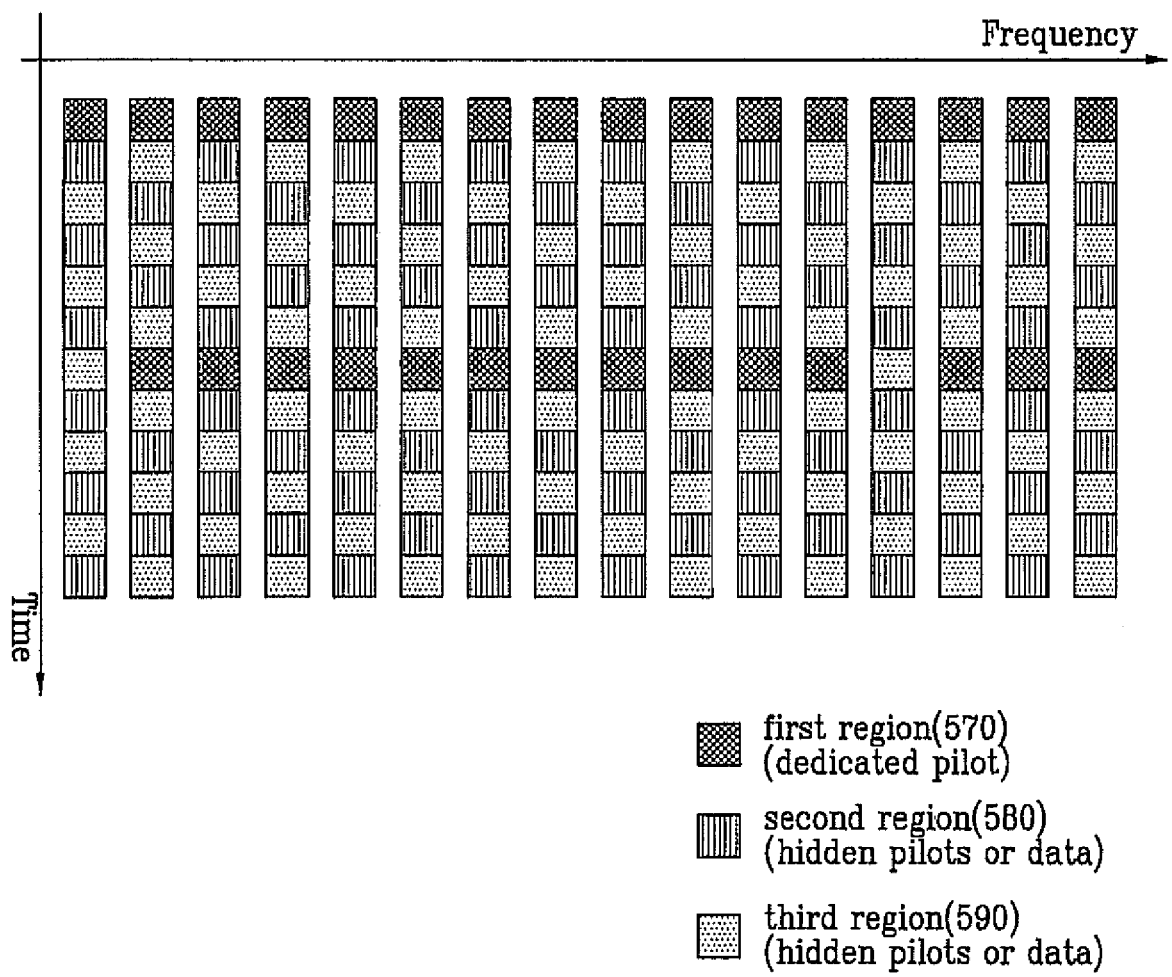

FIG. 6C is a diagram illustrating an example of a method for transmitting TDM type pilots and hidden pilots together in accordance with the embodiment of the present invention. As shown in FIG. 6C, the hidden pilots may be included through the whole frequency-time region or a part of the frequency-time region.

It is preferable that the method for arranging pilots as shown in FIG. 6C is adaptively used depending on the channel environment. In other words, it is preferable that a relatively small number of radio resources are used for the pilots if the channel status is good or the estimated channel value is excellent while a relatively large number of radio resources are used for the pilots if the channel status is not good or the estimated channel value is poor. In more detail, if the radio resources of FIG. 6C are divided into three regions 570, 580 and 590, it is preferable that the first region 570 transmits the dedicated pilots only when the channel status is good (or when the channel environment is good) while the second region 580 additionally transmits the hidden pilots when the channel environment is not good. Also, the hidden pilots may additionally be allocated to the third region 590 when the channel environment becomes worse as the mobile terminal moves at high speed or due to other reasons.

As described above, this embodiment of the present invention can be applied to a single input single output (SISO) system. Also, this embodiment of the present invention can be applied to a multi-input multi-output (MIMO) system which uses a plurality of transmitting/receiving antennas.

If this embodiment of the present invention is applied to the MIMO system, pilots in the SISO system are multiplexed and transmitted through a plurality of antennas. Also, it is more preferable that each of the transmitting antennas transmits pilot signals of different patterns. This embodiment of the present invention suggests pilot patterns having transmitting antennas variable depending on the OFDM symbols and disjointed pilot patterns for each of the transmitting antennas.

Hereinafter, the disjointed pilot patterns will be described.

The disjointed pilot patterns are transmitted using different radio resources depending on the transmitting antennas. In other words, the pilots transmitted through the respective transmitting antennas are transmitted using non-overlapped radio resources.

Figure 7A:
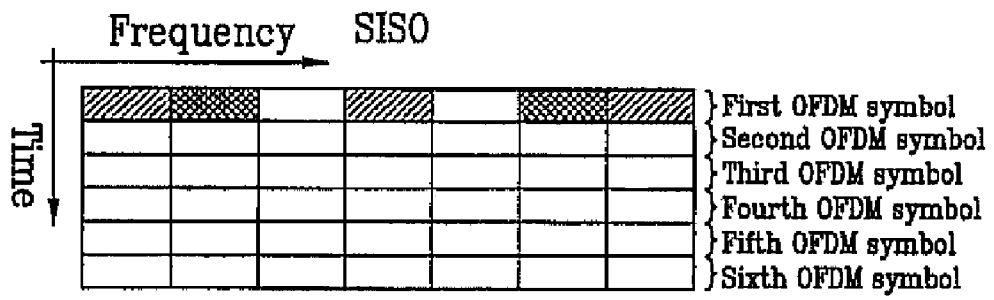
FIGS. 7A to 7H are diagrams illustrating examples of pilot patterns applied to SISO system and MIMO system in accordance with the embodiment of the present invention, wherein the pilot patterns correspond to the case where dedicated pilots and hidden pilots are transmitted together.
Figure 7A:
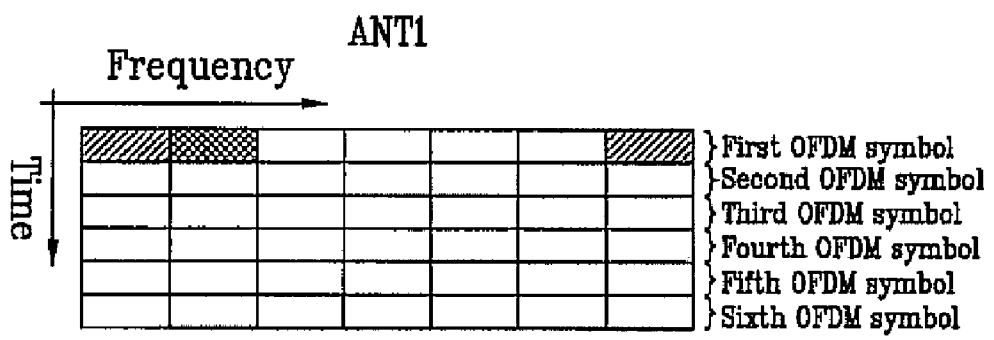
Figure 7A:
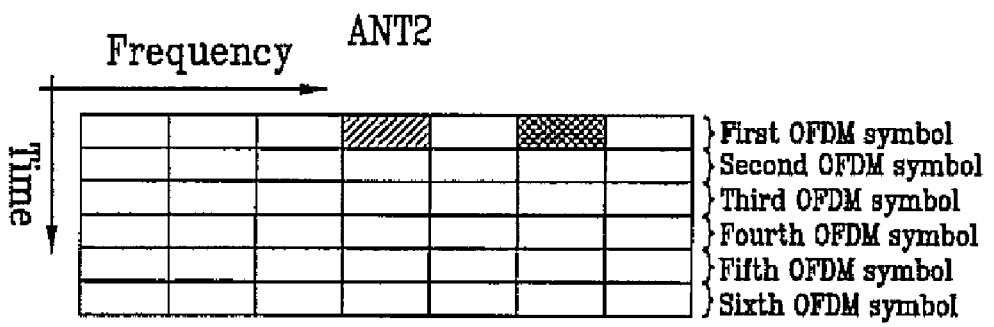

FIG. 7A is a diagram illustrating an example of pilot patterns applied to the SISO system and the MIMO system in accordance with the embodiment of the present invention, wherein the pilot patterns correspond to the case where the dedicated pilots and the hidden pilots transmitted together. In the SISO system, the dedicated pilots and the hidden pilots are included in the first OFDM symbol to be transmitted. However, if this embodiment of the present invention is applied to the MIMO system, all or a part of the dedicated pilots at the SISO system are transmitted through antenna 1 (ANT 1), also all or a part of the hidden pilots at the SISO system are transmitted through ANT 1, and the other dedicated pilots and the other hidden pilots are transmitted through antenna 2 (ANT 2).

It is more preferable that a rate of the dedicated pilots to the hidden pilots allocated to the ANT 1 and the ANT 2 are controlled by various kinds of information. For example, the channel environment for the ANT 1 and the channel environment for the ANT 2 are identified so that more dedicated pilots and more hidden pilots may be allocated to the antenna whose channel environment is poorer. Also, the allocation rates of the dedicated pilots and the hidden pilots may be determined independently from each other or may be associated with each other depending on a preset manner.

As shown in FIG. 7A, the pilots allocated to the ANT 1 and the ANT 2 are not overlapped with each other. The pilot arrangement according to this embodiment of the present invention is characterized in that the pilots are disjointed for each of the antennas. In other words, sub-carriers of the pilots transmitted from each of the antennas are allocated exclusively.

Hereinafter, the pilot patterns applicable to a system using transmitting antennas variable depending on the OFDM symbols will be described, If the dedicated pilots and the hidden pilots are transmitted together in accordance with this embodiment of the present invention, the transmitting antennas may be varied depending on the OFDM symbols to which the pilots are transmitted. In other words, in view of one of a plurality of antennas, the pilot signals are transmitted through specific OFDM symbols. As a result, the pilots according to this embodiment of the present invention are transmitted at different time periods for the respective antennas.

Figure 7B:
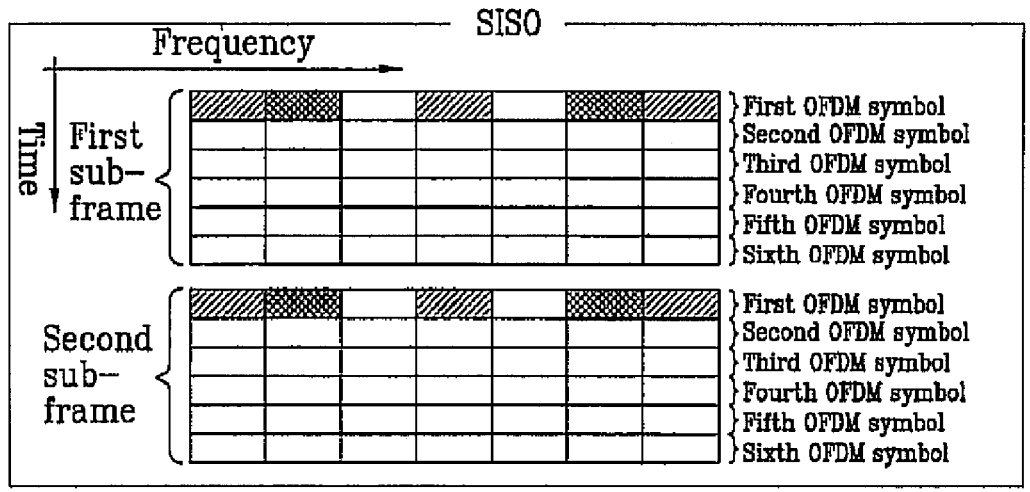
Figure 7B:
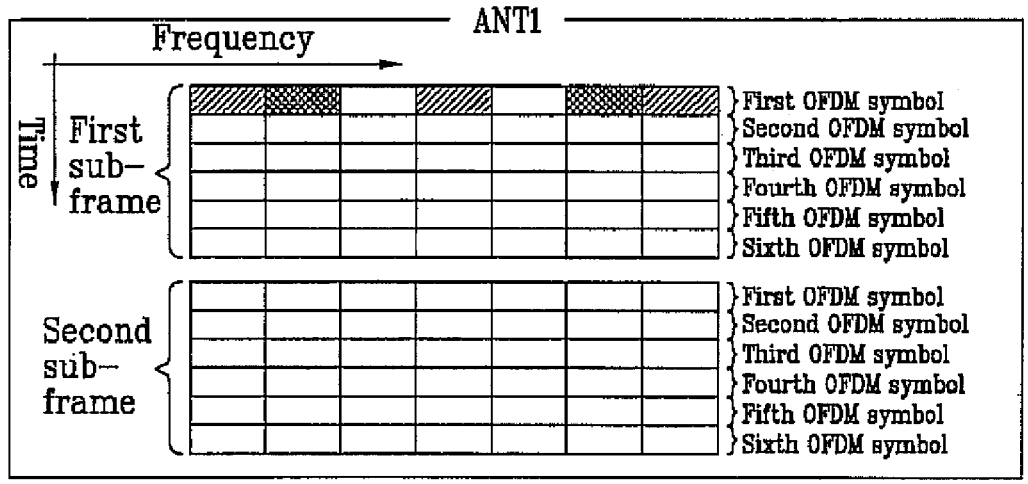
Figure 7B:
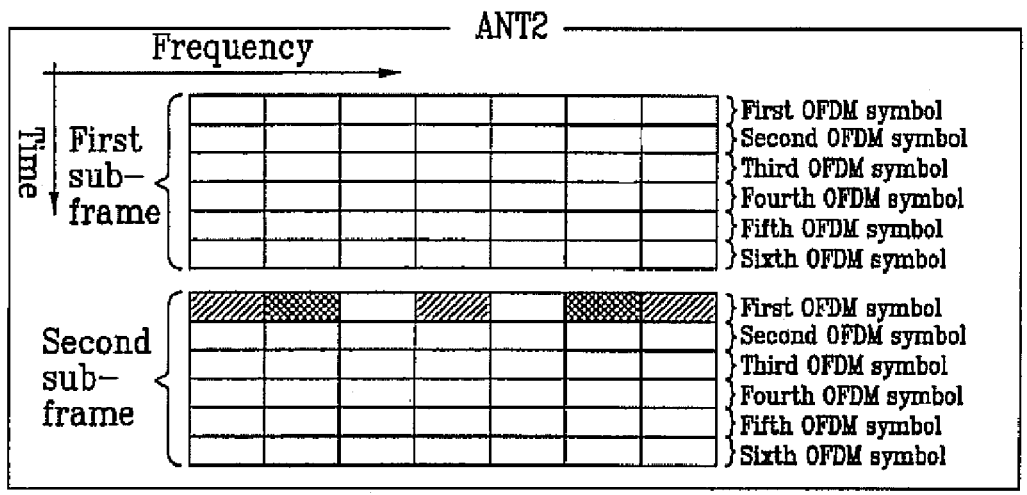
Figure 7B:
Figure 7B:

FIG. 7B is a diagram illustrating another example of a pilot arrangement pattern applied to the SISO system and the MIMO system in accordance with the embodiment of the present invention, wherein the pilot patterns correspond to the case where the dedicated pilots and the hidden pilots transmitted together.

In the SISO system, the dedicated pilots and the hidden pilots are included in the first OFDM symbol to be transmitted. According to this embodiment of the present invention, the pilots included in the first OFDM symbol are transmitted through the ANT 1. Preferably, whether the pilots are allocated to a specific antenna is determined by control information such as channel status or channel environment. For example, the pilots may be allocated to most of the OFDM symbols transmitted through the ANT 1 when the channel status of the ANT 1 is not good. Also, whether the pilots are allocated to a specific antenna may be variable per sub-frame. As shown in FIG. 7B, the pilots may be included in the first OFDM symbol transmitted through the ANT 1 during the first sub-frame, and the pilots may be included in the first OFDM symbol transmitted through the ANT 2 during the second sub-frame. The pilots according to the example of FIG. 7B are transmitted through any one of the antennas for a specific time period.

Figure 7C:
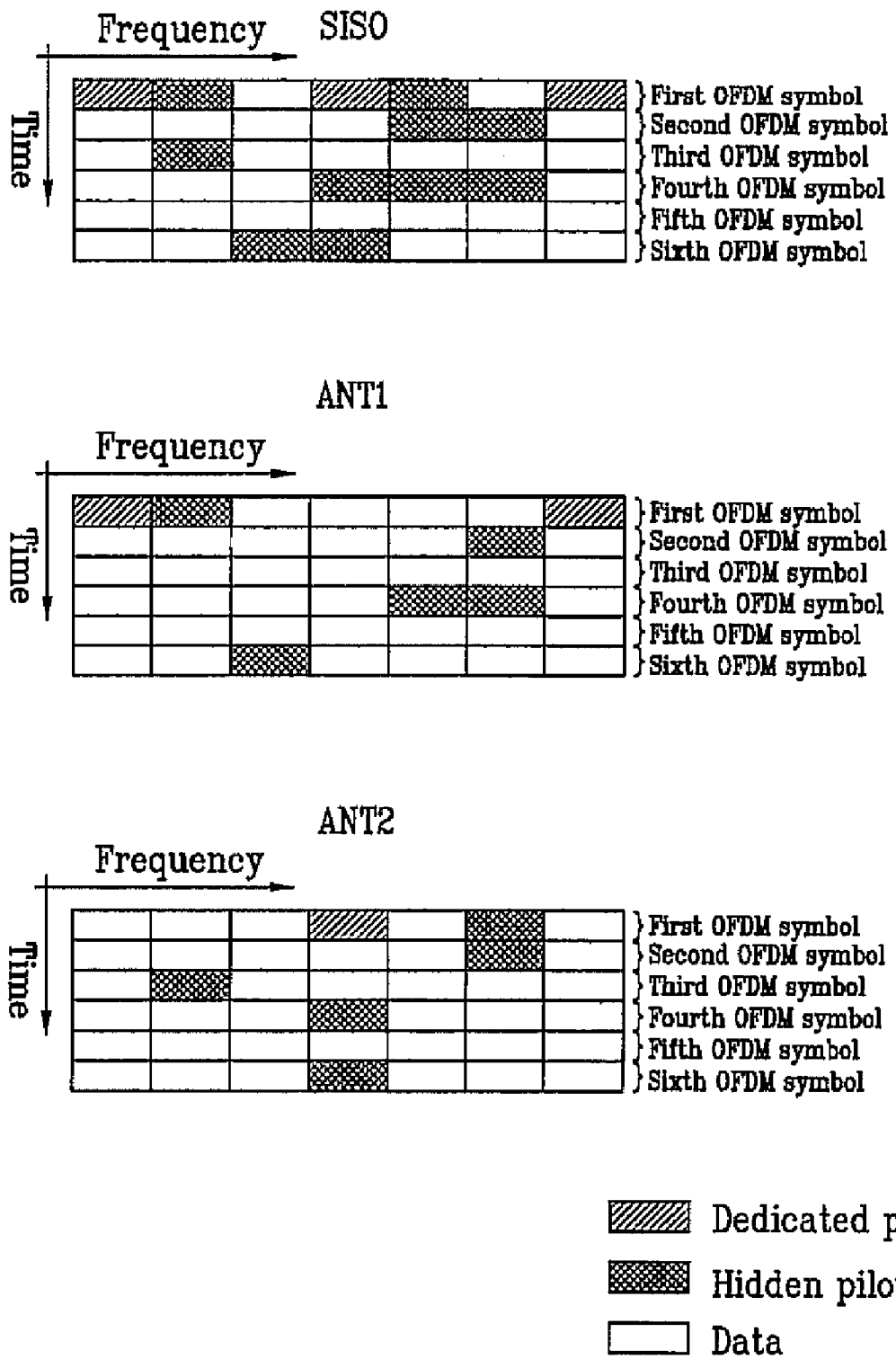

FIG. 7C is a diagram illustrating another example of a pilot arrangement pattern applied to the SISO system and the MIMO system in accordance with the embodiment of the present invention, wherein the pilot arrangement pattern corresponds to the case where the dedicated pilots and the hidden pilots are transmitted together. Referring to FIG. 7C, the disjointed pilot patterns are used in the same manner as FIG. 7A. In other words, the dedicated pilots and the hidden pilots are transmitted together, wherein the pilots transmitted through the ANT 1 and the pilots transmitted through the ANT 2 are transmitted through exclusively allocated radio resources. As described above, whether the pilots are allocated to which antenna or what part of the pilots is transmitted through which antenna can be determined by various kinds of control information.

Figure 7D:
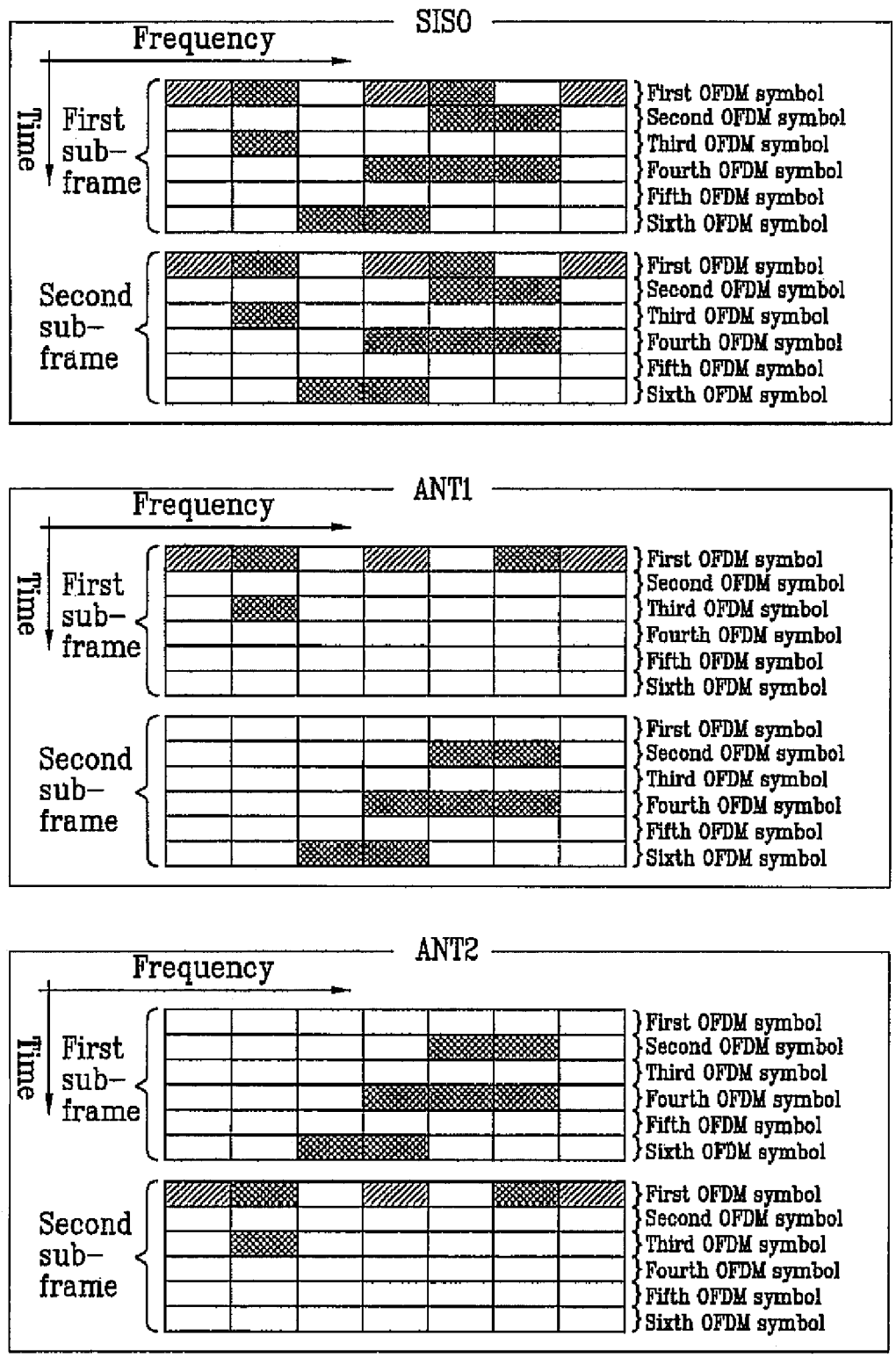

FIG. 7D is a diagram illustrating another example of a pilot arrangement pattern applied to the SISO system and the MIMO system in accordance with the embodiment of the present invention, wherein the pilot arrangement pattern corresponds to the case where the dedicated pilots and the hidden pilots transmitted together. Referring to FIG. 7D, the antenna through which the pilots are transmitted is determined depending on the OFDM symbols with which the pilots are transmitted, in the same manner as FIG. 7B. As shown in FIG. 7D, during the first sub-frame, the pilots are included in the first, third and fifth OFDM symbols transmitted through the ANT 1, and the pilots are included in the second, fourth and sixth OFDM symbols transmitted through the ANT 2. As a result, the respective pilots can be transmitted through any one of the antennas at a specific transmission timing point.

As described above, pilot arrangement according to this embodiment of the present invention may be variable for the unit of sub-frame. During the second sub-frame of FIG. 7D, the pilots are included in the second, fourth and sixth OFDM symbols transmitted through the ANT 1, and the pilots are included in the first, third and fifth OFDM symbols transmitted through the ANT 2. As described above, whether the pilots are allocated to which antenna or what part of the pilots is transmitted through which antenna can be determined by various kinds of control information.

Figure 7E:
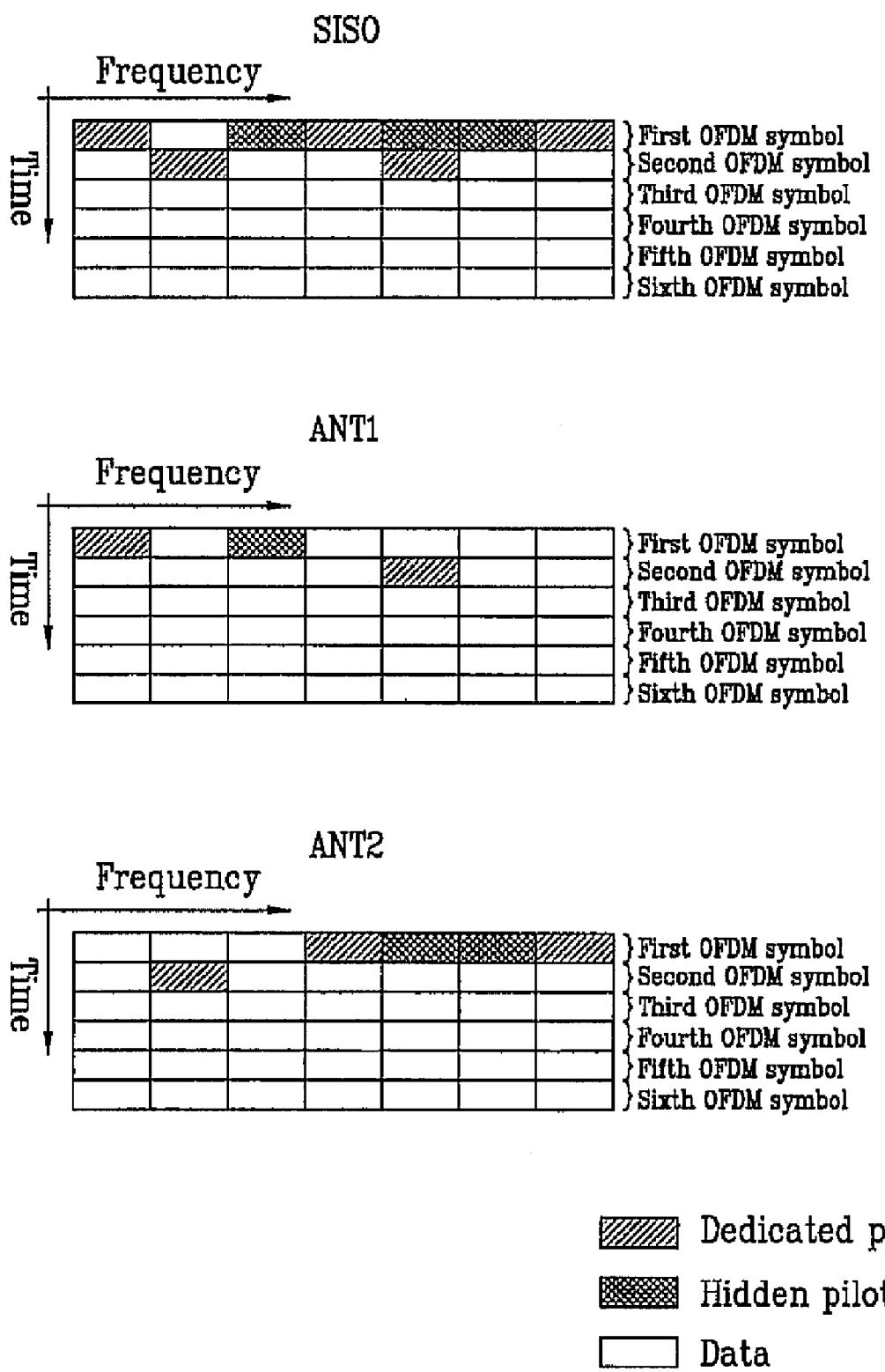

FIG. 7E is a diagram illustrating another example of a pilot arrangement pattern applied to the SISO system and the MIMO system in accordance with the embodiment of the present invention, wherein the pilot arrangement pattern corresponds to the case where the dedicated pilots and the hidden pilots are transmitted together. Referring to FIG. 7E, the disjointed pilot patterns are used in the same manner as FIG. 7A. In other words, the dedicated pilots and the hidden pilots are transmitted together, wherein the pilots transmitted through the ANT 1 and the pilots transmitted through the ANT 2 are transmitted through exclusively allocated radio resources.

In FIG. 7E, the pilots are transmitted through the first OFDM symbol and the second OFDM symbol, and the pilots included in the above two OFDM symbols can be allocated to the respective antennas by an antenna multiplexing mode according to this embodiment of the present invention. As described above, whether the pilots are allocated to which antenna or what part of the pilots is transmitted through which antenna can be determined by various kinds of control information.

Figure 7F:
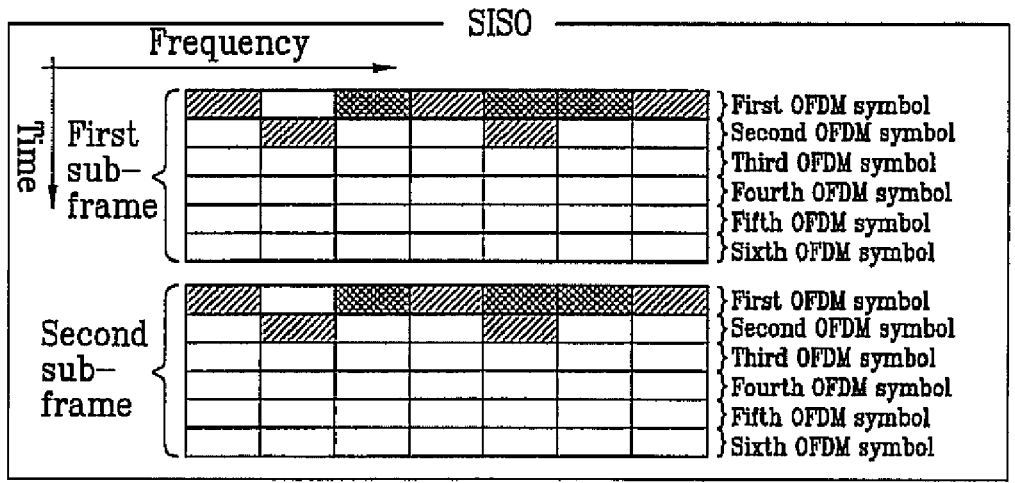
Figure 7F:
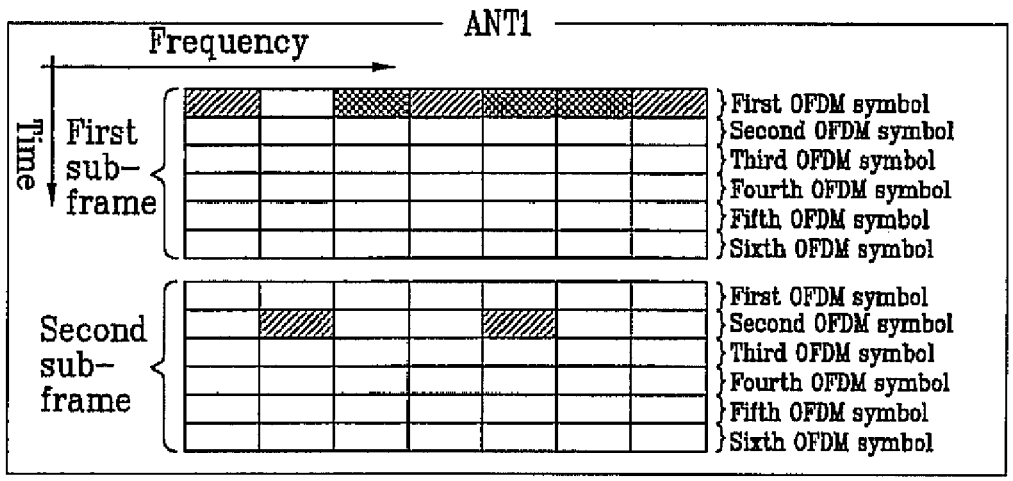
Figure 7F:
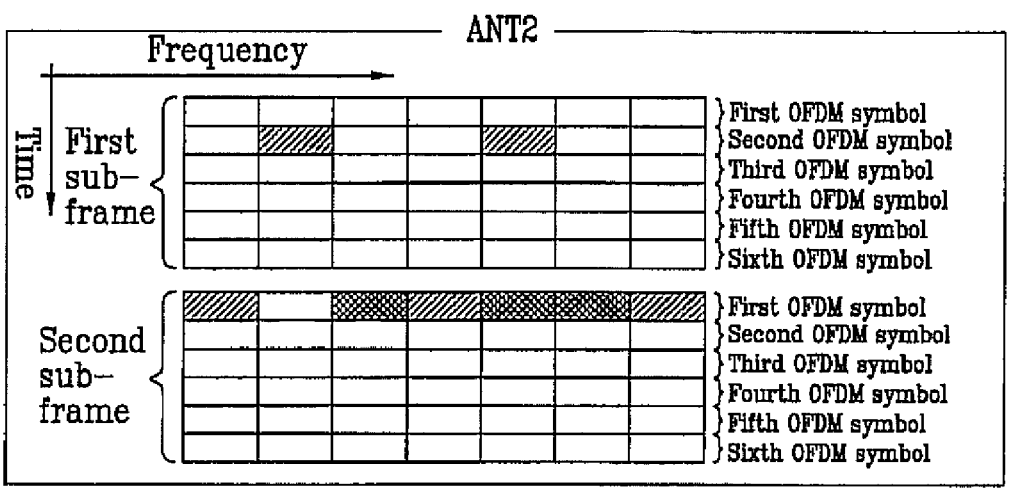

FIG. 7F is a diagram illustrating another example of a pilot arrangement pattern applied to the SISO system and the MIMO system in accordance with the embodiment of the present invention, wherein the pilot arrangement pattern corresponds to the case where the dedicated pilots and the hidden pilots are transmitted together. Referring to FIG. 7F, the antenna through which the pilots are transmitted is determined depending on the OFDM symbols with which the pilots are transmitted, in the same manner as FIG. 7B. As shown in FIG. 7F, during the first sub-frame, the pilots are included in the first, third and fifth OFDM symbols transmitted through the ANT 1, and the pilots are included in the second, fourth and sixth OFDM symbols transmitted through the ANT 2. As a result, the respective pilots can be transmitted through any one of the antennas at a specific transmission timing point.

As described above, pilot arrangement according to this embodiment of the present invention may be variable for the unit of sub-frame. During the second sub-frame of FIG. 7F, the pilots are included in the second, fourth and sixth OFDM symbols transmitted through the ANT 1, and the pilots are included in the first, third and fifth OFDM symbols transmitted through the ANT 2. As described above, whether the pilots are allocated to which antenna or what part of the pilots is transmitted through which antenna can be determined by various kinds of control information.

Figure 7G:
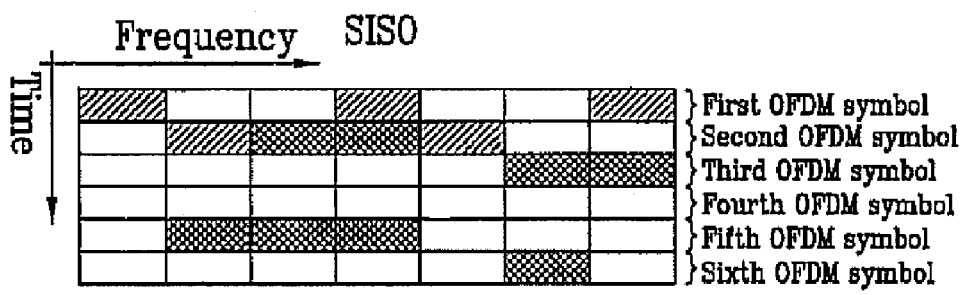
Figure 7G:
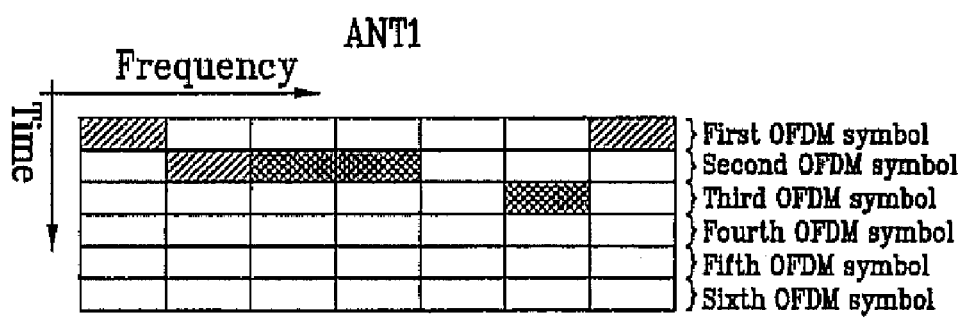
Figure 7G:
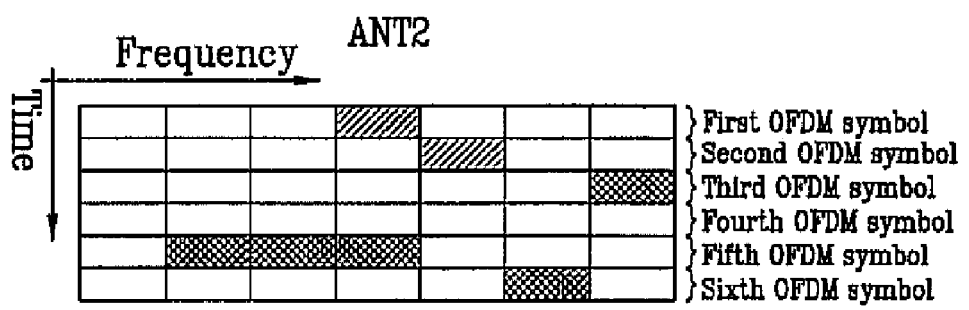

FIG. 7G is a diagram illustrating another example of a pilot arrangement pattern applied to the SISO system and the MIMO system in accordance with the embodiment of the present invention, wherein the pilot arrangement pattern corresponds to the case where the dedicated pilots and the hidden pilots are transmitted together. Referring to FIG. 7G, the disjointed pilot patterns are used in the same manner as FIG. 7A. In other words, the dedicated pilots and the hidden pilots are transmitted together, wherein the pilots transmitted through the ANT 1 and the pilots transmitted through the ANT 2 are transmitted through exclusively allocated radio resources.

In FIG. 7G, the pilots are transmitted through all the OFDM symbols, and the pilots included in the specific sub-frame can be allocated to the respective antennas by an antenna multiplexing mode according to this embodiment of the present invention. As described above, whether the pilots are allocated to which antenna or what part of the pilots is transmitted through which antenna can be determined by various kinds of control information.

Figure 7H:
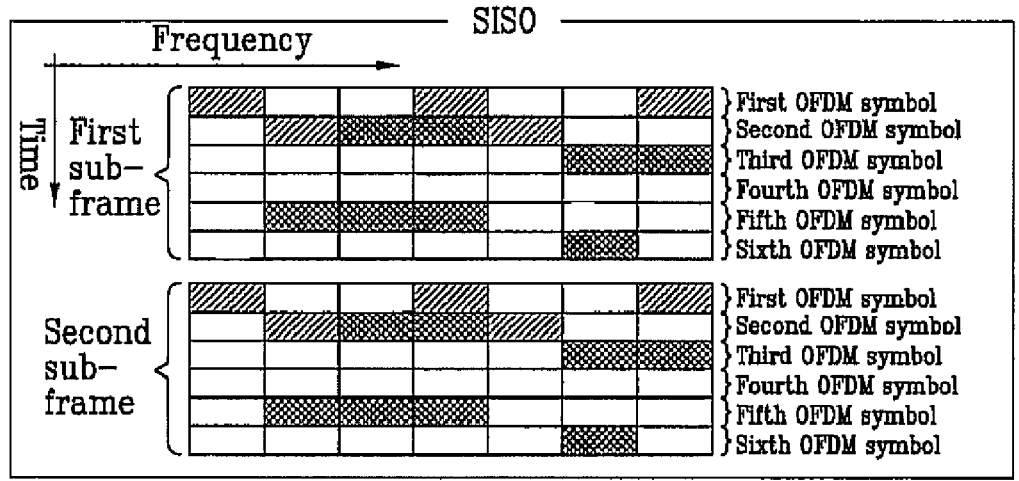
Figure 7H:
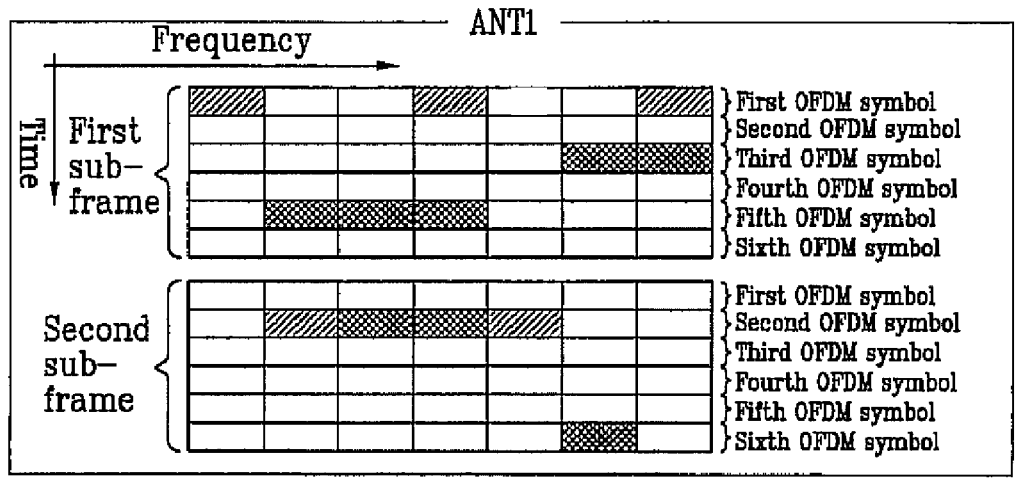
Figure 7H:
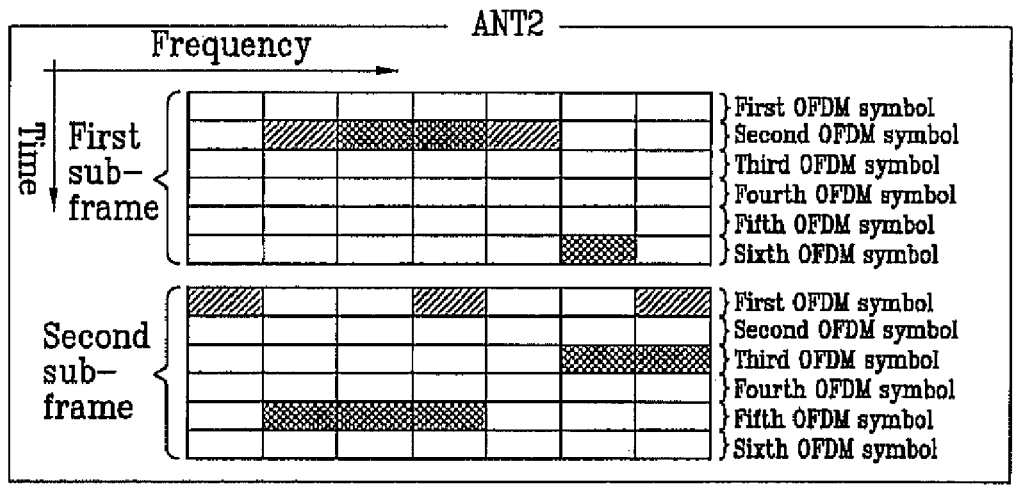
Figure 7H:
Figure 7H:
Figure 7H:
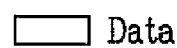

FIG. 7H is a diagram illustrating another example of a pilot arrangement pattern applied to the SISO system and the MIMO system in accordance with the embodiment of the present invention, wherein the pilot arrangement pattern corresponds to the case where the dedicated pilots and the hidden pilots transmitted together. Referring to FIG. 7H, the antenna through which the pilots are transmitted is determined depending on the OFDM symbols to which the pilots are transmitted, in the same manner as FIG. 7B.

The examples of FIG. 7A to FIG. 7H are examples in which antenna multiplexing is performed using two antennas. However, the method for allocating pilots according to the present invention can be applied to a system provided with a various number of antennas, wherein there is no limitation in the number of the antennas.

Figure 8A:
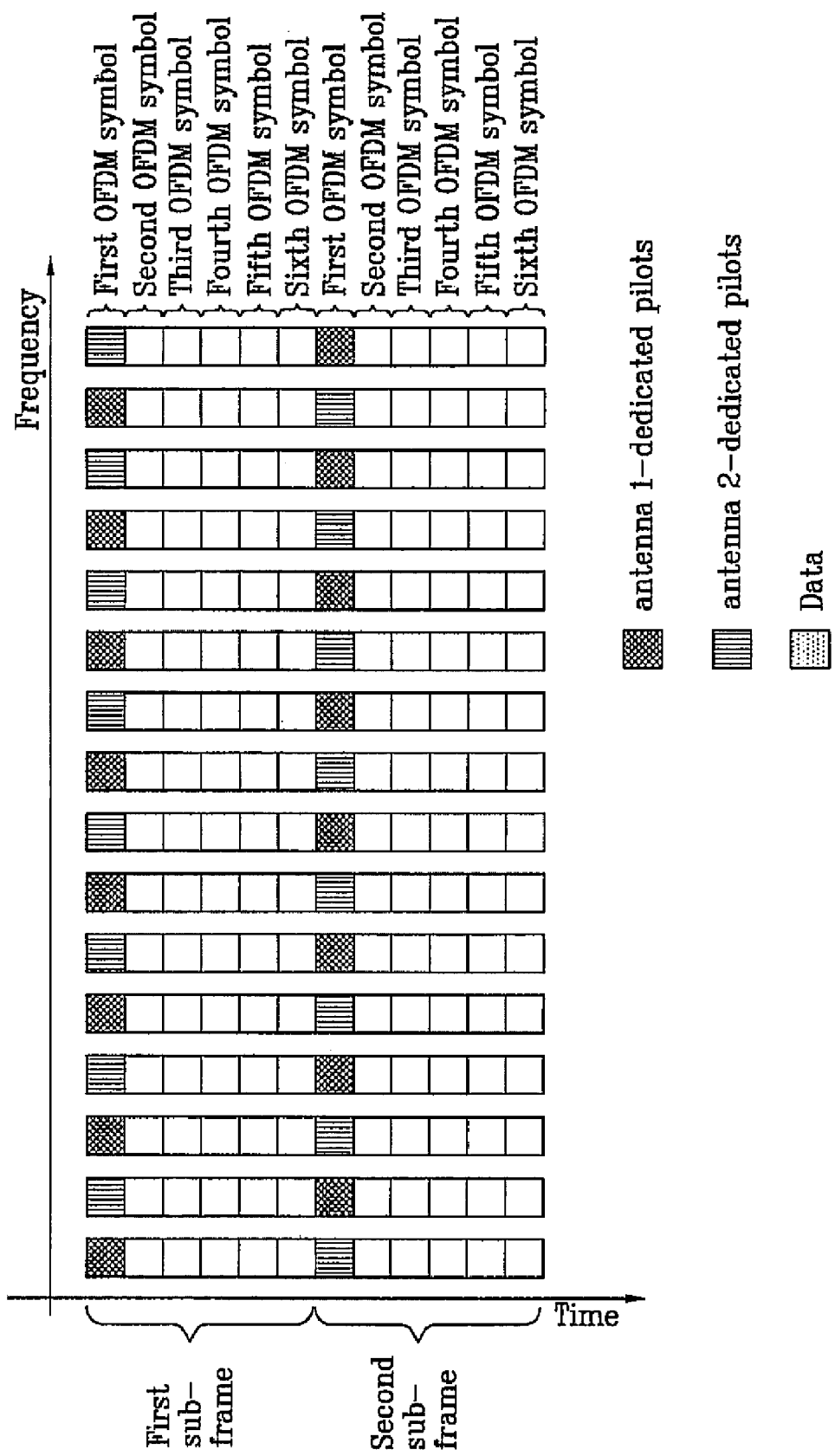
FIGS. 8A to 8C are diagrams illustrating examples of pilot patterns applied to SISO system and MIMO system in accordance with the embodiment of the present invention, wherein the pilot patterns correspond to the case where dedicated pilots and hidden pilots are transmitted together.

FIG. 8A is a diagram illustrating an example of pilots multiplexed into two antennas in accordance with the embodiment of the present invention. As described above, the pilots according to this embodiment of the present invention are disjointed for the respective antennas. In other words, the dedicated pilots transmitted through an antenna 1 and the dedicated pilots transmitted through an antenna 2 are preferably transmitted through different sub-carriers. Also, the pilot arrangement may be varied depending on each of the sub-frames. For example, the sub-carrier which transmits pilots for a specific antenna during the first sub-frame may be different from the sub-carrier which transmits pilots for a specific antenna during the second sub-frame.

Figure 8B:
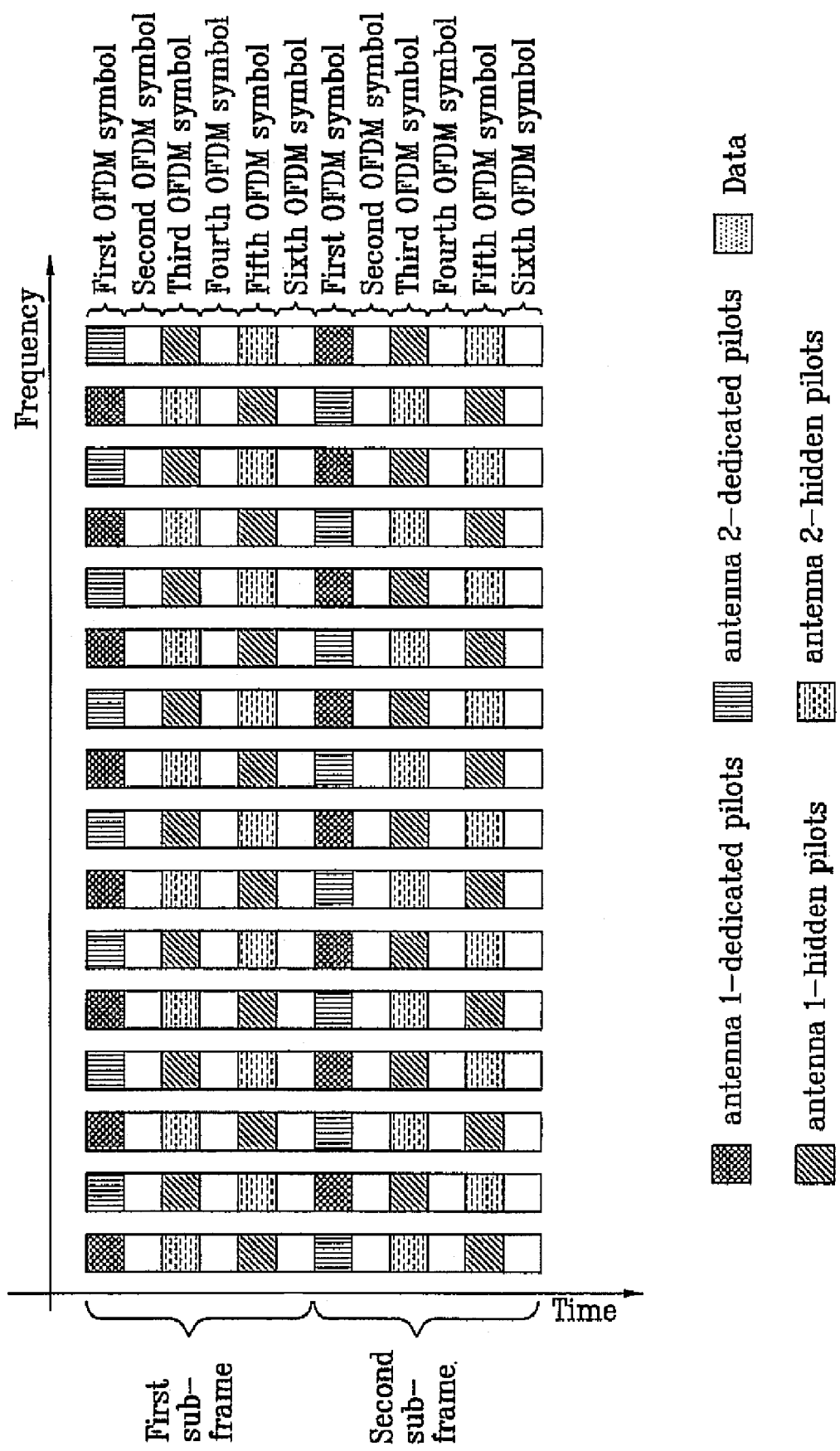

FIG. 8B is a diagram illustrating another example of pilots multiplexed into two antennas in accordance with the embodiment of the present invention. As described above, the dedicated pilots and the hidden pilots according to this embodiment of the present invention are disjointed for the respective antennas. In other words, the dedicated and hidden pilots allocated for an antenna 1 and the dedicated and hidden pilots allocated for an antenna 2 are transmitted to the receiving side through different radio resources.

Figure 8C:
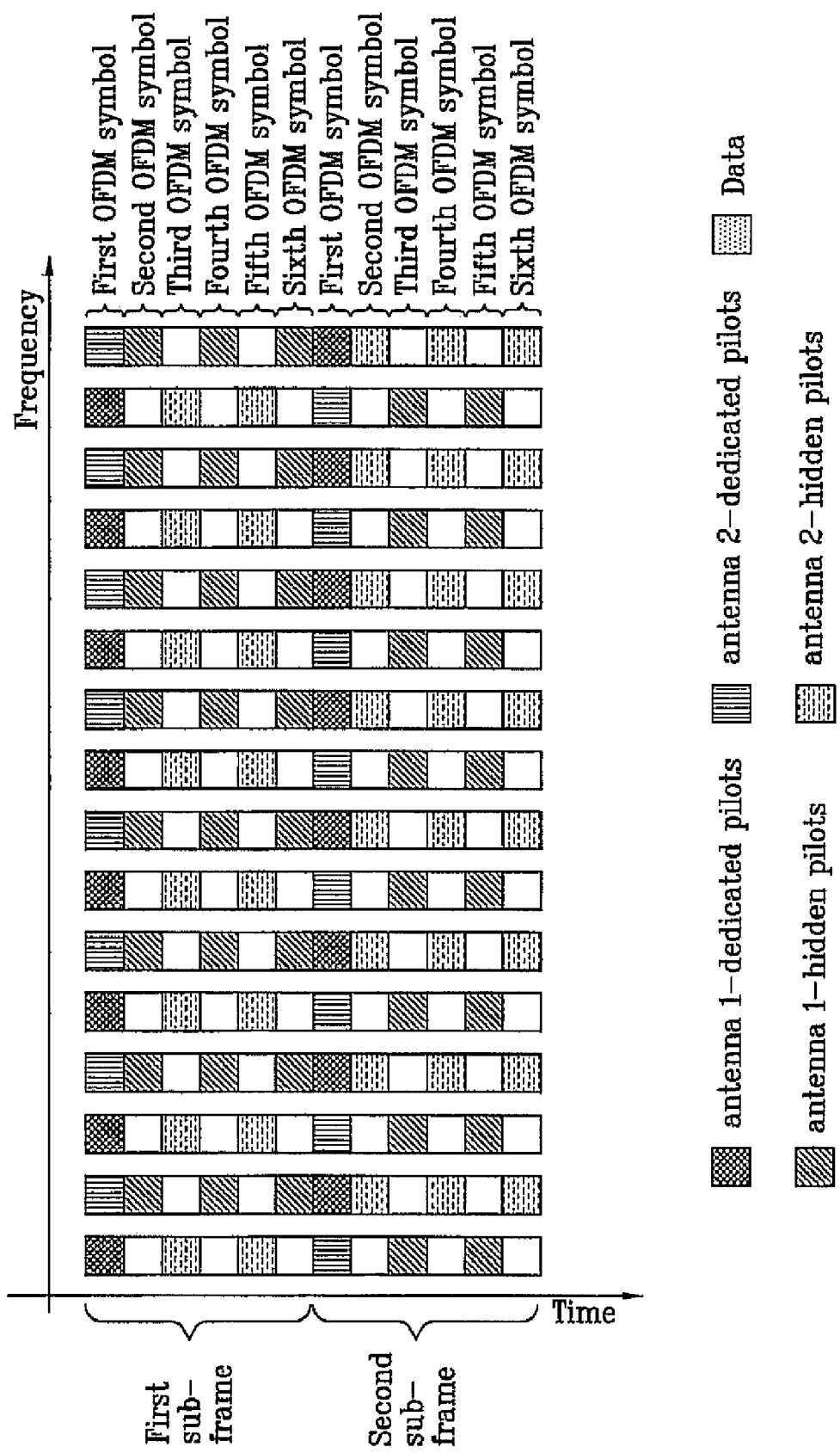

FIG. 8C is a diagram illustrating another example of pilots multiplexed into two antennas in accordance with the embodiment of the present invention. As shown in FIG. 8C, the dedicated pilots are disjointed for the respective antennas. However, the hidden pilots are allocated to a specific antenna depending on the OFDM symbol to which the hidden pilots are transmitted. The pilot arrangement of the dedicated pilots may be varied depending on each of the sub-frames. Also, the pilot arrangement of the hidden pilots may be varied depending on each of the sub-frames.

In other words, the method for arranging disjointed pilots and the method for arranging pilots according to the OFDM symbols can be used together. Also, a part of the hidden pilots may be disjointed, and the other hidden pilots may be transmitted through one of the plurality of antennas depending on the transmitted OFDM symbols. Also, a part of the dedicated pilots may be disjointed, and the other dedicated pilots may be transmitted through one of the plurality of antennas depending on a time period.

The hidden pilots are mainly used for a semi-blind method which transmits pilot information along with data symbols. The hidden pilots are advantageous in that pilots for channel estimation accompanied with additional power need not be allocated. However, the hidden pilots are disadvantageous in that channel estimation performance rapidly becomes bad if a signal to noise ratio (SNR) is low. Accordingly, an initial channel estimation value is required to maintain channel estimation performance. The transmission signals including the hidden pilots can be expressed by Equation 8 below.

$$s_k(m) = d_k(m) + w_k(m) p_k(m)$$  [Equation 8]

In Equation 8, $s_k(m)$ denotes a transmission signal value, $d_k(m)$ denotes a data symbol value transmitted to the receiving side, $w_k(m)$ denotes a weight constant which determines a power rate of the hidden pilots for a corresponding data symbol, and $p_k(m)$ denotes a symbol value of the hidden pilots which will be transmitted along with data. The hidden pilots are transmitted to supplement the scattered pilots or the TDM type pilots, thereby obtaining exact channel estimation performance.

In this embodiment of the present invention, the dedicated pilots and the hidden pilots are combined by various methods to be transmitted. Hereinafter, a method for estimating channels using the pilot signals will be described.

In case that the scattered pilots and the hidden pilots are transmitted together, initial estimation (channel estimation) can be performed using the hidden pilots. Next, the estimated channels can be reinforced using the scattered pilots. In other words, the channel values are estimated by the hidden pilots, and the estimated channel values are corrected using the scattered pilots. As another method for estimating channels, the channels are estimated using the scattered pilots, and the estimated channel values are corrected using the hidden pilots.

Figure 9:
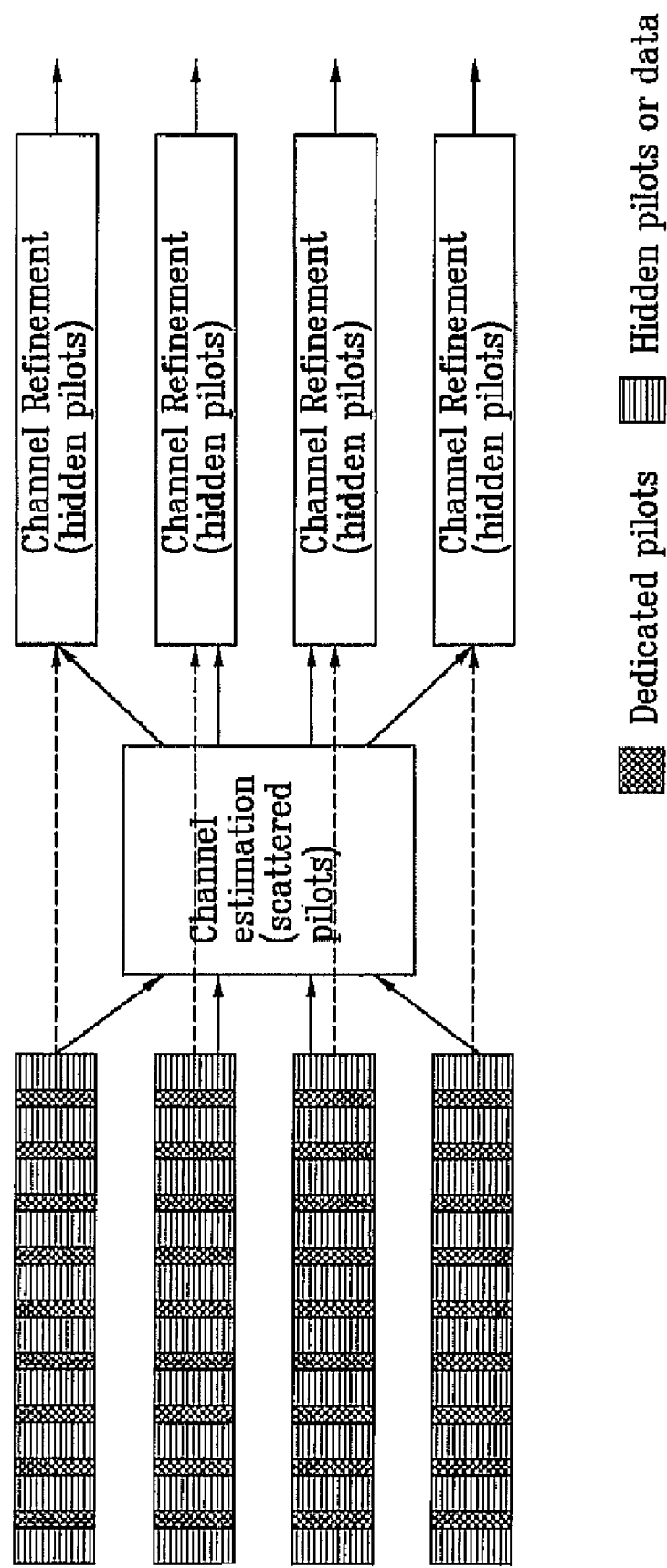
FIG. 9 is a diagram illustrating a concept of a method for estimating channels using scattered pilots and correcting the estimated channel values using hidden pilots.

FIG. 9 is a diagram illustrating a concept of a scheme for channel estimation using the scattered pilots and correcting the estimated channel values using the hidden pilots. In the case that the channels are estimated through the scattered pilots, i.e., the dedicated pilots, an averaged channel value for the OFDM symbols which include the pilots is calculated. In other words, the channel value that can be estimated through the dedicated pilots is not a separate value of each of the OFDM symbols but an average value of all of the OFDM symbols which include the dedicated pilots. Accordingly, in case of FIG. 9, the average value of all of the OFDM symbols which include the dedicated pilots is acquired through the dedicated pilots, and the channel value of each of the OFDM symbols is corrected through the hidden pilots. In other words, the channel value of the OFDM symbols is refined by the hidden pilots.

When the channels are estimated using only one OFDM symbol, the aforementioned two schemes indicate the same result. However, if several OFDM symbols are simultaneously used, the two schemes indicate different results. The channel value estimated by the first scheme has an error greater than that estimated by the second scheme. The first scheme is advantageous in that transition of the overall channels is quickly sensed. The channel value estimated by the second scheme approximates to the actual channel value. In other words, the second scheme is preferably used in view of accuracy of the channel.

Figure 10:
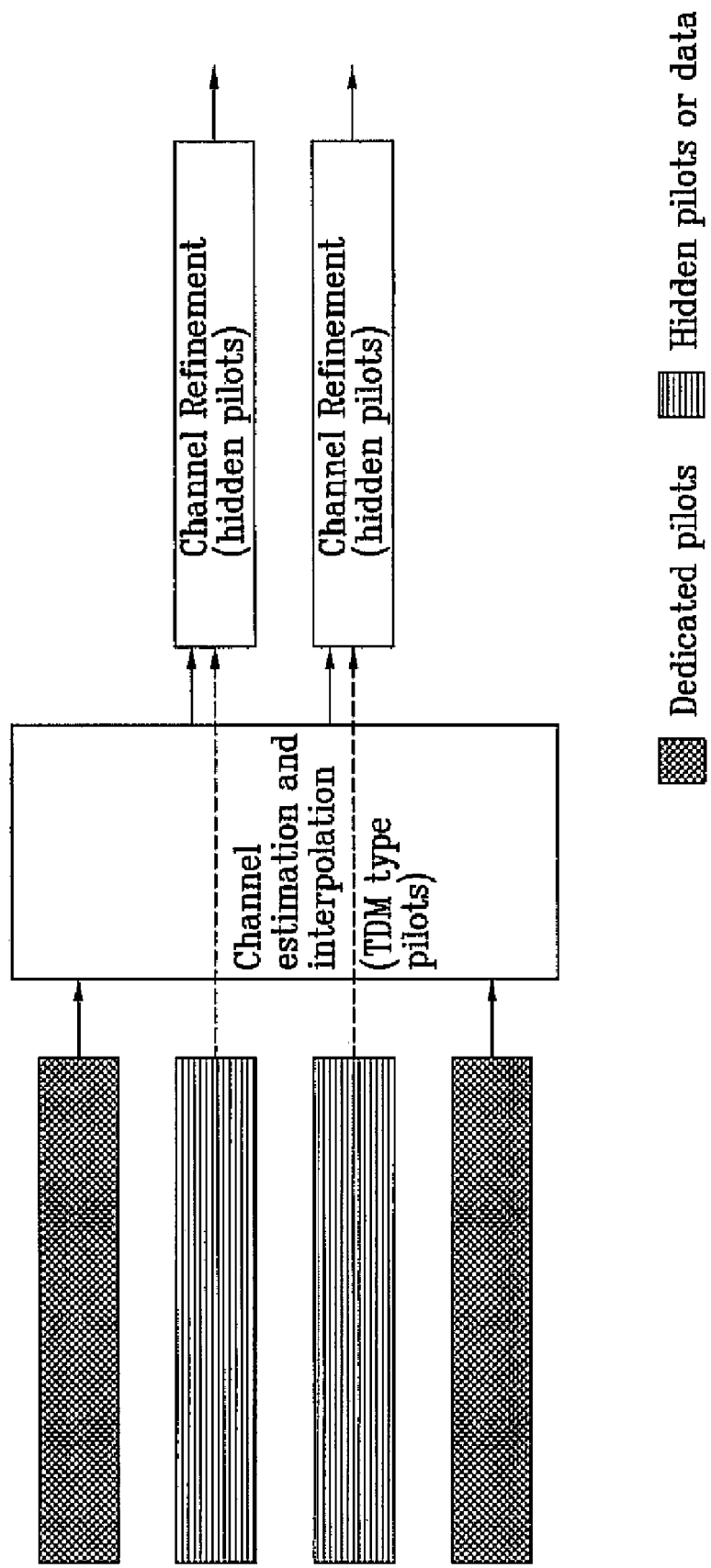
FIG. 10 is a diagram illustrating a concept of a method for estimating channels using TDM type pilots and correcting the estimated channel values using hidden pilots.

Meanwhile, in the case that the TDM type pilots and the hidden pilots are transmitted together, the channel value is estimated using the TDM type pilots. Interpolation or prediction is performed so that the estimated channel value is changed to a more exact value. In other words, after the channel is estimated through the result of Equation 5, interpolation is performed for each of the multi-paths, the channel value is corrected using the hidden pilots located for a specific time to exactly estimate the channel at the specific time position. In other words, the channel value is estimated by the TDM type pilots, and the estimated channel value is corrected depending on the respective OFDM symbols. When the estimated channel value is corrected, the hidden pilots are used. In FIG. 9 or FIG. 10, to correct the initial channel value, which is already estimated, using the hidden pilots, a related art hidden pilot based channel estimation scheme can be used.

FIG. 10 is a diagram illustrating a concept of a scheme for estimating channels using the TDM type pilots and correcting the estimated channel values using the hidden pilots. A channel estimated by performing interpolation for the TDM type pilots is designated as an initial channel value at a corresponding position. The initial channel value is corrected by the hidden pilots. Also, if there exists the channel estimated value corrected by the hidden pilots, the later channel value is updated by the channel value corrected by the hidden pilots rather than the channel value estimated by the TDM type pilots, whereby the channel estimation can be performed more exactly.

If the schemes of FIG. 9 and FIG. 10 are performed, the scheme for estimating channels using the dedicated pilots can be based on Equation 1 to Equation 5. $\bar{h}(m)$ estimated by Equation 1 to Equation 5 is corrected by the hidden pilots. If correction is performed by the hidden pilots, a cost function corresponding to sum of errors during channel estimation is expressed by Equation 9 below.

$$J(m) = |\vec{r}(m) - H(m) \cdot \vec{s}(m)|^2 \quad \text{[Equation 9]}$$

In Equation 9, $\vec{r}^{(m)}$ denotes a receiving signal, H(m) denotes a channel value, and $\vec{s}^{(m)}$ denotes a transmission signal. Also, an operation symbol · denotes direct product operation where elements of vectors are multiplied by each other. If a channel estimated value Ĥ(m) where Equation 9 reaches a minimum value is defined, it is added to the initial value $\bar{H}(m)$ of the channel, which is interpolated and estimated from the dedicated pilots. There may be various schemes of updating the channel estimated value. For example, Ĥ(m) and $\bar{H}(m)$ can be added to each other by Equation 10 or Equation 11 below.

$$H(m) = (1-\lambda)\bar{H}(m) + \lambda\hat{H}(m) \quad \text{[Equation 10]}$$

In Equation 10 above, Ĥ(m) and $\bar{H}(m)$ are added to each other by a specific weight value λ. The initial value $\bar{H}(m)$ of the channel can be determined unlike Equation 10, and the channel value can be adapted so that Equation 9 reaches a minimum value. Equation 11 prevents Equation 9 from reaching a local minimum.

$$H^n(m) = H^{n-1}(m) - \mu \frac{\partial J(m)}{\partial H(m)} \quad \text{[Equation 11]}$$

In Equation 11, n denotes an integer which indicates the result of the n$^{th}$ iteration, and μ denotes an adaptation constant. The initial channel is determined by H$^0$(m)=$\bar{H}$(m). H$^{n-1}$(m) can be obtained by Equation 10 above.

Another embodiment of the present invention provides a method for improving a signal to noise ratio (SNR) at the receiving side and improving decoding performance of received signals by improving channel estimation performance in a mobile communication system which supports an HARQ scheme. If channel estimation performance at the receiving side does not reach a certain level, more power may be required in allowing the receiving side to perform decoding of the signals transmitted from the transmitting side, or decoding may not be performed. In particular, considering that the mobile communication system supports users who move at high speed, the users cannot obtain proper channel performance using the related art pilot structure.

According to one feature of the embodiment of the present invention, in the case that the transmitting side receives a negative acknowledgement signal (NACK) from the receiving side in the mobile communication system which supports an HARQ scheme, the transmitting side transmits a retransmission packet including reference signals included in a prior packet and additional reference signals.

According to the other feature of the embodiment of the present invention, the receiving side estimates a channel using the reference signal added to the retransmission packet to improve accuracy of channel estimation, thereby recovering a packet transmitted from the transmitting side without error.

Figure 11:
FIG. 11 is a diagram illustrating comparison between a related art HARQ scheme and a method for constructing retransmission packets on a time axis in accordance with an HARQ scheme of the present invention.
Figure 11:
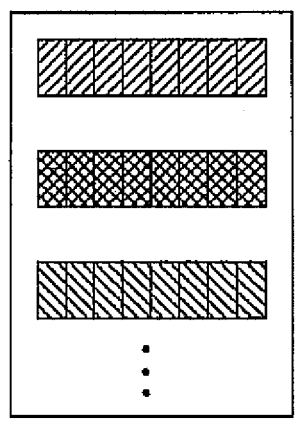
Figure 11:
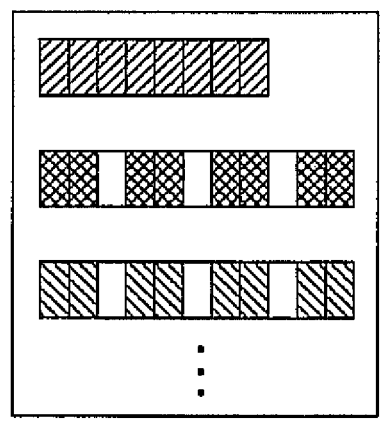

FIG. 11 is a diagram illustrating differences between the related art HARQ scheme and a scheme for constructing retransmission packets on a time axis in accordance with the HARQ scheme in accordance with the embodiment of the present invention. The top of FIG. 11 denotes a codeword to be transmitted to the receiving side. The codeword a data sequence which have undergone a channel coding processing and have a format where channel coded parity bits are added to an input data stream.

FIG. 11(a) is a diagram illustrating a scheme for constructing retransmission packets in the related art HARQ scheme, wherein an initial transmission packet is configured by a first parity part (parity part 1), for example, an input data stream, among the codeword is transmitted. If the transmitting side receives NACK from the receiving side in response to the initial transmission packet, the transmitting side constructs a first retransmission packet using a second parity part (parity part 2) among the codeword to be transmitted and transmits the first retransmission packet to the receiving side. If the transmitting side receives NACK for the first retransmission packet, the transmitting side constructs a second retransmission packet by using a third parity part (parity part 3) among the codeword and transmits the second retransmission packet to the receiving side.

FIG. 11(b) is a diagram illustrating a scheme for configuring retransmission packets in an HARQ scheme according to the embodiment of the present invention. Referring to FIG. 11(b), pilot signals are added to a predetermined position of a parity part to construct a retransmission packet so that the retransmission packet is transmitted to the receiving side, unlike FIG. 11(a) where the first and second retransmission packets are constructed using the parity parts only.

In the examples of FIG. 11, the method for constructing the initial transmission packet and the respective retransmission packets using the codeword to be transmitted are only exemplary. The retransmission packets may be constructed by various methods depending on types of the HARQ scheme. However, in the embodiment of the present invention, pilot signals are added to a predetermined position of the retransmission packet regardless of the construction method of the retransmission packet. In other words, in FIG. 11(a), decoding performance of the receiving side is considered by an incremental redundancy (IR) method and a chase combining or maximum ratio combining (MRC) method, wherein the IR method is to transmit parity bits which are not transmitted previously and the chase combining or MRC method is to repeatedly transmit data which are previously transmitted. However, FIG. 11(b), in addition to the IR method and the chase combining or MRC method, additional pilot signals are included in the retransmission packets to improve channel estimation performance, thereby improving decoding performance.

Figure 12:
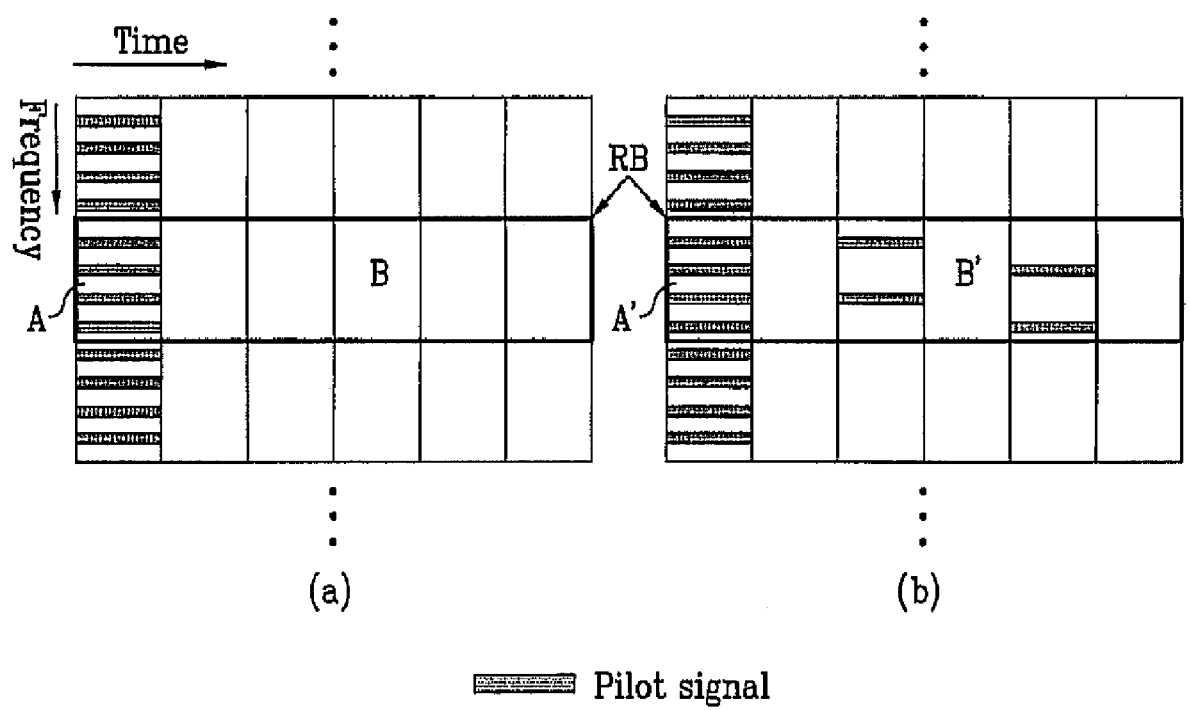
FIG. 12 is a diagram illustrating a preferred example of a method for constructing retransmission packets on a frequency-time axis in accordance with an HARQ scheme in an OFDM or OFDMA mobile communication system of the present invention.

FIG. 12 is a diagram illustrating a preferred example of a method for constructing retransmission packets on a frequency-time axis in accordance with an HARQ scheme in an OFDM or OFDMA mobile communication system of the embodiment. In the OFDM or OFDMA mobile communication system, a data frame can be expressed by a two-dimensional dimensional plane where frequency is used as a vertical axis and time is used as a horizontal axis. Here, channel resources allocated to the transmitting side and the receiving side can be expressed by the two-dimensional plane, and a minimum unit of the channel resources that can be allocated to the transmitting side and the receiving side is referred to as a resource block (RB).

FIG. 12(a) is a diagram for illustrating a scheme of configuring an initial transmission packet transmitted from the transmitting side to the receiving side, wherein a front portion of the resource block includes basic pilot signals and its back portion B includes data to be transmitted to the receiving side. If the receiving side receives the initial transmission packet, the receiving side performs channel estimation based on the basic pilot signals and recovers the received packet using estimated channel values. In this case, if the receiving side fails to recover the received packet, the receiving side transmits NACK to the transmitting side. If the transmitting side receives NACK from the receiving side, the transmitting side constructs a retransmission packet as shown in FIG. 12(b) and transmits the retransmission packet to the receiving side. In FIG. 12(b), the retransmission packet is comprised of basic pilot signals of a front portion A' and additional pilot signals of a back portion B'. If the receiving side receives the retransmission packet of FIG. 12(b), the receiving side performs channel estimation by using the basic pilot signals and the additional pilot signals and recovers the received packet by using the estimated result.

A 3GPP long term evolution (LTE) system which is currently being discussed considers both a synchronous HARQ scheme and an asynchronous HARQ scheme. The synchronous HARQ scheme means the case where a retransmission packet is transmitted at a timing point previously promised between the transmitting side and the receiving side, i.e., a prescribed timing point. The asynchronous HARQ scheme means the case where packet retransmission according to HARQ may occur at any time. The asynchronous HARQ scheme may be regarded as a better mode than the synchronous HARQ scheme in that resource waste may be avoided at early termination. However, since the synchronous HARQ scheme can reduce MAC layer signaling, it is advantageous in that band resources are not wasted. Regardless of packet transmission through a previously allocated data region or a data region separately allocated per packet transmission in accordance with the synchronous HARQ scheme and the asynchronous HARQ scheme, the allocation unit for packet transmission is the number of constant sub-carriers (25 sub-carriers, 375 KHz) on a frequency axis and at least one transit time interval on a time axis.

Packet transmission between the transmitting side and the receiving side in FIG. 12 will now be described in more detail. The transmitting side is allocated with channel resources, i.e., at least one resource block (RB) through a control channel and transmits an initial transmission packet through the allocated resource block. The receiving side performs channel estimation of the whole channels using pilot signals included in a front portion A of the resource block.

The channel estimation is performed for recovering received signals by compensating distortion of signals, wherein the distortion is caused by rapid environment change due to fading. The channel estimation is generally performed using pilot signals which the transmitting side and the receiving side previously are informed of.

A procedure of performing channel estimation using the received pilot signals at the receiving side will now be described briefly. Since the receiving side has information of the pilot signals previously, the receiving side separates the information of the pilot signals from the received signals to perform channel estimation and compensates the estimated channel values to exactly estimate the data transmitted from the transmitting side. Supposing that the pilot signals transmitted from the transmitting side are p, channel information during transmission of the pilot signals is h, thermal noise generated at the receiving side is n, and the signals received in the receiving side are h, y=h·p+n can be obtained. In this case, channel information $\hat{h}$ can be estimated by Equation 12 below using the fact that the receiving side already knows the pilot signals p.

$$\hat{h}=y/p=h+n/p=h+\hat{n} \quad [\text{Equation 12}]$$

Accuracy of the channel estimated value $\hat{h}$ estimated using the pilot signals p is determined depending on $\hat{n}$. Accordingly, to estimate an exact value of $\hat{h}$, $\hat{n}$ should be converged into 0. To this end, it is preferable to minimize influence of $\hat{n}$ by estimating the channel using a large number of pilot signals.

The receiving side performs channel equalization for a packet using the channel estimated values. The signals equalized by channel equalization are changed to input signals of a channel decoder through proper processing for channel decoding.

If the transmitting side transmits a retransmission packet in response to NACK from the receiving side, the channel values estimated using the pilot signals of the initial transmission packet is corrected at each time position through the additional pilots, whereby packet recovery at a corresponding position can be performed more exactly.

Figure 13:
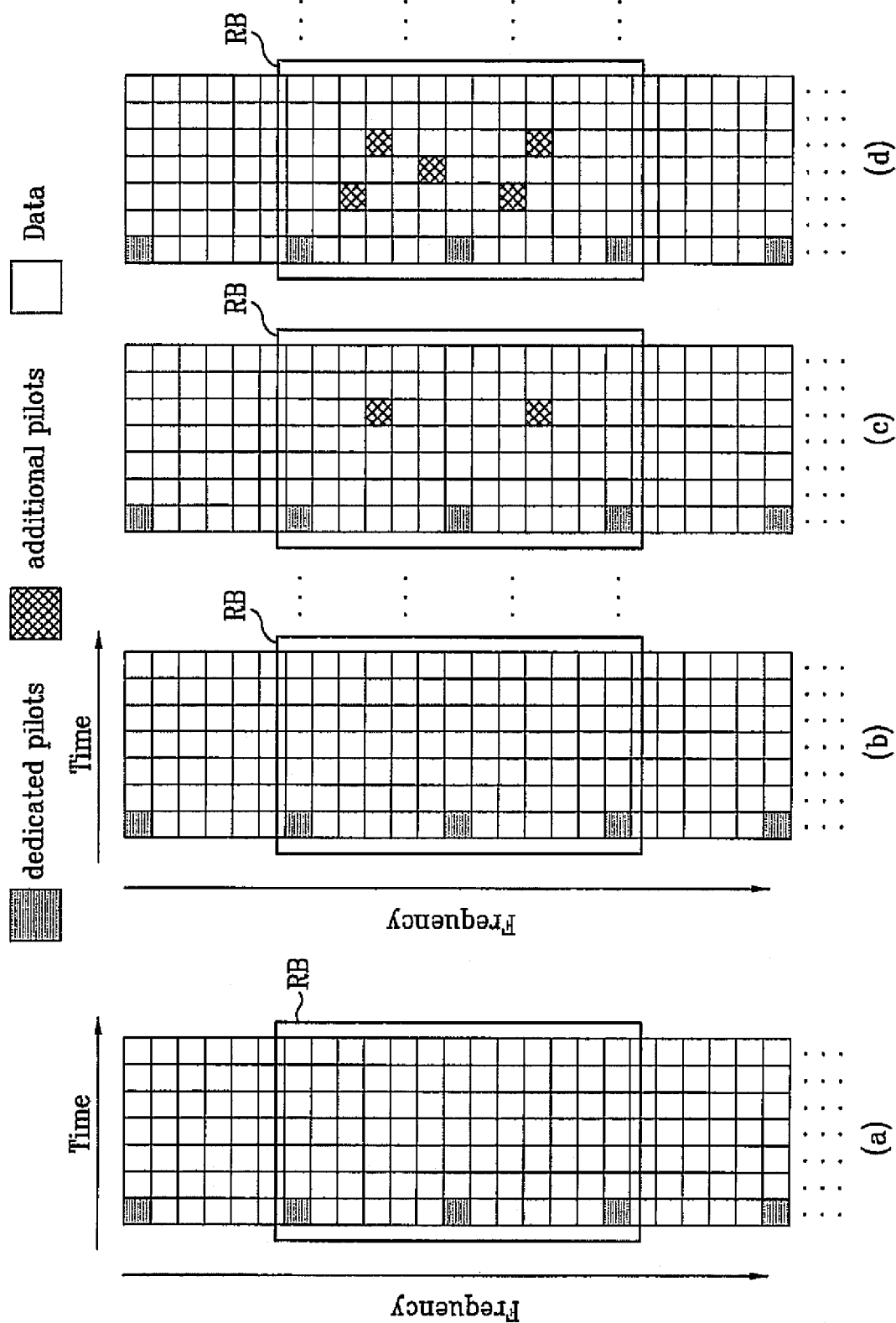
FIG. 13 is a diagram illustrating a method for constructing transmission packets in accordance with the embodiment of the present invention.

FIG. 13 is a diagram illustrating another method for constructing transmission packets in accordance with the embodiment of the present invention. Referring to FIG. 13, a retransmission mode for improving SNR is combined with a retransmission mode for lowering a channel estimation error.

If the transmitting side is moving very quickly or quality of the received signals is very low, many errors occur in the channel estimation based on the basic pilot signals included in an initial transmission packet. Since later channel accuracy at the OFDM symbol position becomes lower in accordance with the lapse of time, success probability of channel decoding becomes very low. The initial packet transmission may be failed due to several factors. First, packet transmission may be failed due to low SNR. Second, packet transmission may be failed due to channel estimation error. Accordingly, it is preferable to consider a retransmission mode that can solve the above two factors, for retransmission of packets.

Generally, if the HARQ scheme is used, the number of retransmission times is limited to a specific value (for example, six times). Accordingly, packet transmission for improvement of SNR is combined with retransmission for compensating channel estimation error within the range corresponding to the specific value, so that the factors of retransmission request can be overcome.

First at the initial packet transmission for corresponding packet transmission in FIG. 13(a), the transmitting side transmits the initial packet through a allocated resource block. The receiving side performs channel estimation of the whole channels by using the basic pilot signals included in the front portion of the resource block. The receiving side recovers the initial transmission packet based on the estimated channel values. If the receiving side fails to recover the initial transmission packet, the receiving side transmits NACK to the transmitting side.

If the transmitting side receives NACK from the receiving side, the transmitting side configures a retransmission packet for compensating loss caused by SNR of the receiving side and transmits the retransmission to the receiving side. In other words, the retransmission packet of FIG. 13(b) is to compensate loss caused by SNR of the receiving side by adding parity bits without additional pilot signals. The number of retransmission times of retransmission packets, which compensates SNR of the receiving side, can be selected within a range one time smaller than the limited range of the number of retransmission times provided that the transmitting side receives NACK1 from the receiving side. Even though the transmitting side has transmitted the retransmission packet to the receiving side as much as the selected number of times ((n-1) times), the transmitting side configures the retransmission packet for improving channel estimation performance as shown in FIG. 13(c) and transmits the retransmission packet during $n^{th}$ retransmission if NACK is received from the receiving side. The retransmission packet for improving channel estimation performance is a packet including additional pilot signals included in the other region in addition to the basic pilot signals included in the front portion of the resource block. Even though the transmitting side has constructed the retransmission packet for improving channel estimation performance to transmit the retransmission packet as shown in FIG. 13(c), the transmitting side can reconstruct the retransmission packet for improving channel estimation performance to transmit it to the receiving side as shown in FIG. 13(d) if NACK is received from the receiving side. At this time, as shown in FIG. 13(d), additional pilot signals can increase or their position can be changed as the number of retransmission times increases.

As described above, the maximum number of transmission times of the retransmission packets, which compensates SNR of the receiving side, can be within a range one time smaller than the limited number of retransmission times. Likewise, the possible number of retransmission times of the retransmission packets which include additional pilot signals can be within a range one time smaller than the limited number of times for retransmission. However, the sum of the two types of the number of retransmission times should not exceed the limited number of retransmission times.

For example, supposing that the limited number of retransmission times is 5, the retransmission packet for compensating SNR of the receiving side as shown in FIG. 13(b) can be transmitted minimum one time to maximum four times. The retransmission packet for improving channel estimation performance of the receiving side as shown in FIGS. 13(c) and 13(d) can be transmitted maximum four times to minimum one time depending on the number of transmission times of the retransmission packet shown in FIG. 13(b). In other words, combination of {1,4}, {2,3}, {3,2}, {4,1} could be the possible number of transmission times of the retransmission packets for compensating SNR of the receiving side and the retransmission packets for improving channel estimation performance of the receiving side as shown in FIG. 13(c). Of course, retransmission corresponding to each number of times is limited to the case where the retransmission request (NACK) is received from the receiving side. An HARQ message can be added to a part where control information is transmitted so that patterns of the pilot signals can be changed during transmission of each packet.

Figure 14:
FIG. 14 is a diagram illustrating various types where additional pilot signals are included in retransmission packets in accordance with the present invention.
Figure 14:
Figure 14:
Figure 14:
Figure 14:
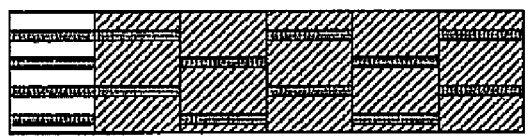
Figure 14:
Figure 14:
Figure 15:
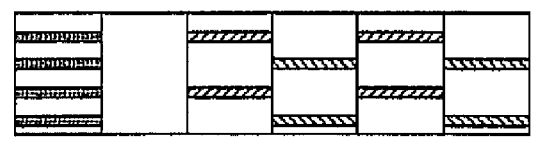
FIG. 15 is a diagram illustrating an example of a configuration of retransmission packets transmitted from a transmitting side provided with two transmitting antennas.
Figure 15:
Figure 15:

FIG. 14 is a diagram illustrating various types of adding additional pilot signals in a retransmission packet in accordance with the embodiment of the present invention. FIG. 14(a) corresponds to the case where pilot signals are partially added to a single symbol (partial insertion on single symbol), FIG. 14(b) corresponds to the case where pilot signals are fully added to a single symbol (full insertion on single symbol), and FIG. 14(c) corresponds to the case where pilot signals are partially added to two symbols (partial insertion on several symbols). FIG. 14(d) corresponds to the case where pilot signals are filly added to two symbols (full insertion on several symbols), FIG. 14(e) corresponds to the case where pilot signals are partially added to full symbols (partial insertion on full symbols), and FIG. 14(f) corresponds to the case where pilot signals are fully added to fill symbols (full insertion on full symbols), Meanwhile, when the transmitting side transmits data by using multi-antennas in a MIMO system, it is preferable to include additional pilot signals in a retransmission packet for each antenna. FIG. 15 is a diagram illustrating an example of a configuration of a retransmission packet transmitted from a transmitting side provided with two transmitting antennas. Referring to FIG. 15, it is noted that the position, the number or patterns of the additional pilot signals may be varied for each antenna (antenna A or antenna B).

Figure 16:
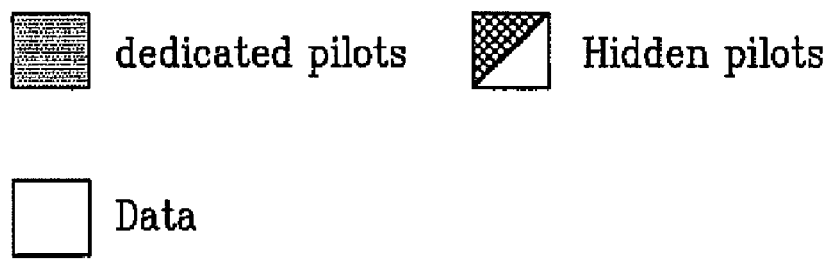
FIG. 16 is a diagram illustrating that additional pilots included in retransmission packets are hidden pilots in accordance with the embodiment of the present invention.
Figure 16:
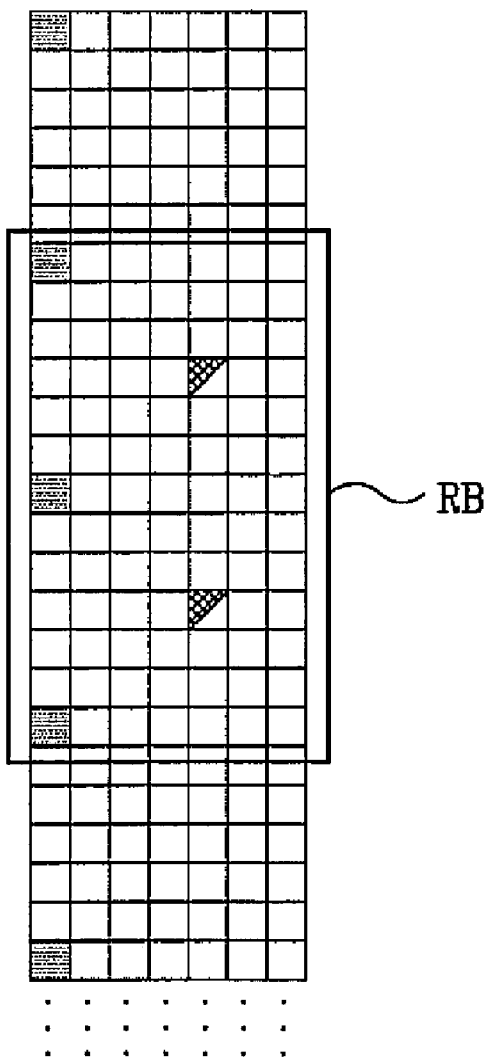

FIG. 16 is a diagram for illustrating that additional pilots can be included in a retransmission packet in the form of hidden pilots. The hidden pilots mean pilot signals combined with transmission data not independent pilot signals. The hidden pilots may be expressed as pilot signals added to transmission data or pilot signals included in phase of transmission data.

Meanwhile, in the aforementioned embodiments, if the additional pilot signals are included in a retransmission packet, the transmitting side should notify the receiving side of control information associated with the additional pilot signals such as the additional pilot signals and positions in which the additional pilots are added. The pilot signal related control information can be transmitted through the HARQ message. The receiving side updates the channel estimated value by identifying the additional pilot signals from the pilot signal related control information included in the HARQ message and combining the identified pilot signals with the basic pilot signals, and recovers the packet transmitted from the transmitting side using the updated channel estimated value. Alternatively, the pilot signal related control information such as the additional pilot signals and the positions may commonly be used between the transmitting side and the receiving side by prior consent or negotiation, so that the control information may not be transmitted per retransmission. At this time, the receiving side updates the channel estimated value by identifying the additional pilot signals in accordance with the common information and combining the identified pilot signals with the basic pilot signals, and recovers the packet transmitted from the transmitting side using the updated channel estimated value.

If the pilot arrangement according to the embodiment of the present invention is used, it is easy to support the mobile terminal of high speed, channel change can be estimated within a broader range, and the mobile terminal can be in an idle mode during a specific sub-frame. Also, the mobile terminal of high speed can improve system throughput under various circumstances, and system throughput and BER performance can be varied by adjusting the transmission power and the number of the hidden pilots.

The method for retransmitting packets according to the other embodiment of the present invention has the following advantages.

First, the receiving side can improve channel estimation performance using the additional reference signal included in the retransmission packets.

Second, since channel estimation performance is improved, it is possible to more exactly recover the received signals. Particularly, it is possible to improve throughput of a link of the user who moves at high speed.

Third, since no mandatory signal of the mobile terminal of high speed is required, it is possible to simplify the LTE system.

Finally, since the SNR requirements required for channel decoding are alleviated due to decrease of channel estimation errors, it is possible to perform symbol decoding for a short time period.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for a transmitter to transmit pilots to a receiver, the method comprising:

transmitting first type pilots to the receiver via one or more transmission antennas using time-frequency resources; and transmitting second type pilots to the receiver via the one or more transmission antennas using time-frequency resources upon which data is transmitted, wherein the time-frequency resources are defined by a plurality of sub-carriers in a frequency domain and a plurality of orthogonal frequency division multiplexing (OFDM) symbols in a time domain, and wherein different pairs of sub-carriers and OFDM symbols within the time-frequency resources are used for transmitting the first type pilots via each of the one or more transmission antennas;

wherein data is transmitted on the time-frequency resources upon which the second type pilots are transmitted; and wherein data is not transmitted on the pairs of sub-carriers or OFDM symbols within the time-frequency resources upon which the first type pilots are transmitted.

2. The method as claimed in claim 1, wherein the first type pilots are allocated in a scattered form.

3. The method as claimed in claim 1, wherein the first type pilots are allocated in a time division multiplexing (TDM) mode and a scattered form.

4. A method for a receiver to receive pilots from a transmitter, the method comprising:

receiving first type pilots from the transmitter via one or more transmission antennas using time-frequency resources; and receiving second type pilots from the transmitter via the one or more transmission antennas using time-frequency resources upon which data is received, wherein the time-frequency resources are defined by a plurality of sub-carriers in a frequency domain and a plurality of orthogonal frequency division multiplexing (OFDM) symbols in a time domain, and wherein different pairs of sub-carriers and OFDM symbols within the time-frequency resources are used for receiving the first type pilots via each of the one or more transmission antennas;

wherein data is received on the time-frequency resources upon which the second type pilots are received; and wherein data is not received on the pairs of sub-carriers or OFDM symbols within the time-frequency resources upon which the first type pilots are received.

5. The method as claimed in claim 1, wherein the first type pilots are dedicated pilots and the second type pilots are hidden pilots.

6. The method as claimed in claim 4, wherein the first type pilots are dedicated pilots and the second type pilots are hidden pilots.

* * * * *

UNITED STATES PATENT AND TRADEMARK OFFICE
CERTIFICATE OF CORRECTION

PATENT NO. : 7,830,972 B2
APPLICATION NO. : 11/688207
DATED : November 9, 2010
INVENTOR(S) : Yeong Hyeon Kwon et al.

Page 1 of 1

It is certified that error appears in the above-identified patent and that said Letters Patent is hereby corrected as shown below:

Claim 1, Column 23, Line 13; delete the first word "or" and insert the word -- and --.

Claim 4, Column 24, Line 14; after the word "sub-carriers" delete the word "or" and insert the word -- and --.

Signed and Sealed this
Thirtieth Day of August, 2011

David J. Kappos
*Director of the United States Patent and Trademark Office*